United States Patent
Ridolfo

[19]

[11] Patent Number: 6,091,790

[45] Date of Patent: Jul. 18, 2000

[54] CONTROL ELEMENT ASSEMBLY POSITION SYSTEM

[75] Inventor: Charles F. Ridolfo, Bloomfield, Conn.

[73] Assignee: Combustion Engineering, Inc., Windsor, Conn.

[21] Appl. No.: 09/074,822

[22] Filed: May 8, 1998

[51] Int. Cl.[7] .............................. G21C 17/00; G21C 7/06
[52] U.S. Cl. ............................................ 376/259; 376/237
[58] Field of Search .................................... 376/219, 236, 376/237, 245, 257–259, 327

[56] References Cited

U.S. PATENT DOCUMENTS

| | | | |
|---|---|---|---|
| 3,752,735 | 8/1973 | Musick et al. | 176/19 |
| 4,016,034 | 4/1977 | Musick | 176/22 |
| 4,075,059 | 2/1978 | Bruno et al. | 176/12 |
| 4,330,367 | 5/1982 | Musick | 376/245 |

*Primary Examiner*—Charles T. Jordan
*Assistant Examiner*—Jack Keith
*Attorney, Agent, or Firm*—Alix, Yale & Ristas, LLP

[57] ABSTRACT

Compliance with administrative limits on cumulative exposure of control rod groups in the reactor core, is monitored by computing the incremental effective exposure for each group commensurate with core power, for each time increment at which each group is within the position range where an administrative limit is imposed. The increments of effective exposures for each group are accumulated, and the accumulated effective exposure for each group is compared with the administrative limit to each group. This comparison is then displayed to the reactor operator, preferably using either a "rolling wheel" or "sliding bar" format.

6 Claims, 23 Drawing Sheets

CEA Rod Position System
Summary Display

| | 4 Hour Exposure per 24 Hours | | 5 EFPD Exposure per 30 EFPD | | 14 EFPD Exposure per 365 EFPD | |
|---|---|---|---|---|---|---|
| | Total Hours | Margin (Hrs) | Accumulated EFPD | Margin (EFPD) | Accumulated EFPD | Margin (EFPD) |
| REG Group 1 | 0 | 4.0 | 0 | 5.0 | 0 | 14.0 |
| REG Group 2 | 0 | 4.0 | 0 | 5.0 | 0 | 14.0 |
| REG Group 3 | 0 | 4.0 | 0 | 5.0 | 0 | 14.0 |
| REG Group 4 | 0 | 4.0 | 1.2 | 3.8 | 4.3 | 9.7 |
| REG Group 5 | 2.5 | 1.5 | 3.0 | 2.0 | 9.2 | 4.8 |

LCO Criteria

| | 7 EFPD Exposure per 30 EFPD | | 14 EFPD Exposure per 365 EFPD | |
|---|---|---|---|---|
| | Accumulated EFPD | Margin (EFPD) | Accumulated EFPD | Margin (EFPD) |
| PS Group A | 5.0 | 2.0 | 8.4 | 5.6 |
| PS Group B | 5.0 | 2.0 | 8.4 | 5.6 |

Display Menu

| 1 | = | Summary Display | |
| 2 | = | PS Groups: | 7 per 30 EFPD |
| 3 | = | PS Groups: | 14 per 365 EFPD |
| 4 | = | RG Groups: | 4 per 24 hours |
| 5 | = | RG Groups: | 5 per 30 EFPD |
| 6 | = | RG Groups: | 14 per 365 EFPD |

Figure 23

CONTROL ELEMENT ASSEMBLY POSITION SYSTEM

BACKGROUND OF THE INVENTION

The present invention relates to nuclear power plants, and in particular, to on-line monitoring of control rod positions relative to regulatory requirements for short term, long-term, and transient insertion limits.

Commercial nuclear power plants are subject to comprehensive regulatory compliance covering virtually every phase of nuclear reactor operation. Many of these regulatory constraints are manifested in the form of so-called "Technical Specifications", which are an integral part of the operating license for the power plant. Each vendor of a nuclear steam supply system (NSSS), achieves compliance with the technical specifications, by formulating and justifying operating procedures for approval by the regulatory authorities.

In pressurized water nuclear power plants (PWR plants), one type of Technical Specification concerns the accumulated time during which control rods are present in the reactor core. As is well known, control rods serve two important functions. The extent of insertion directly affects the gross power level in the reactor core. Another function is to control the local distribution of power in the core, thereby avoiding high localized power peaking, relative to the average power generated in the core. The prolonged insertion of particular control rods in the core, especially during periods of relatively high power, can have two detrimental effects long term. First, the pattern of fuel consumption can be distorted to the extent that upon removal of these rods, new, previously unpredicted local power peaking or power oscillations may arise. Furthermore, control rods can prematurely lose effectiveness over time.

It is also well known that individual control rods can be ganged together as an assembly for insertion and removal by a single drive mechanism, and that a plurality of assemblies, such as four or eight, can be controlled as a group for substantially simultaneous movement into and out of the core. Four or five groups are typically programmed for staggered insertion and withdrawal from the core (unless, of course, all groups are to be dropped simultaneously to trip, or "scram", the reactor). For purposes of the present disclosure, a cluster of control rods which are moved by a single drive mechanism, are referred to as a "control element assembly" (CEA), whereas a plurality of CEA's which are controlled for substantially simultaneous movement into and out of the reactor, are referred to as a "CEA group".

According to one approach for compliance with Technical Specifications, plant Limiting Conditions of Operation (LCO) are established to impose operational constraints with regard to CEA rod group insertions and thereby assure that the design bases which underlie the Technical Specifications are not violated. These limitations are typically characterized in terms of restrictions imposed on CEA rod group insertions between the Long Term Steady State Insertion Limit (LTSSIL) and the Transient Insertion Limit (TIL). These restrictions are typically expressed in terms of either clock hours, or effective full power days (EFPD) of exposure. An EFPD is the exposure equivalent of 24 hours at the licensed full power operation of the reactor. In addition, restrictions are imposed upon exceeding the Short Term Steady State Insertion Limit (STSSIL) under certain conditions. In a PWR, all CEA's are typically out of (above) the core at full steady state power, and are inserted downwardly into the core to reduce power level. Typical examples of limiting conditions of operation are set forth in the following Table 1.

TABLE 1

| ROD GROUP APPLICABILITY | OPERATIONAL LIMITATION (LCO) | CRITERIA |
| --- | --- | --- |
| Regulating | Insertion between STSSIL and TIL | Limit to 4 hours per 24 hour interval |
| Regulating | Insertion between LTSSIL and TIL | Limit to 5 EFPD per 30 EFPD interval |
| Regulating | Insertion between LTSSIL and TIL | Limit to 14 EFPD per 365 EFPD interval |
| Regulation | Insertion beyond the STSSIL with COLSS out ot service | Take Prescribed Action within 1 hour |
| Part Strength | Insertion between LTSSIL and TIL | Limit to 7 EFPD per 30 EFPD interval |
| Part Strength | Insertion between LTSSIL and TIL | Limit to 14 EFPD per 365 EFPD interval |

These restrictions limit the duration (in terms of hours) that CEA rods can be positioned between the STSSIL and the TIL, and the amount of CEA exposure which can be accumulated (in terms of Effective Full Power Hours) for insertions between the LTSSIL and the TIL. The graph of FIG. 20 depicts typical operational regions bounded by these insertion limits.

The LTSSIL is a position limit in which there is no restriction for CEA rod insertions which are above this position. However, CEA rod insertions below this position and bounded by the TIL are constrained to the limits of CEA exposure as noted in Table 1.

The STSSIL is a position limit below (i.e., greater than) the LTSSIL in which further restrictions on insertion (time duration—as opposed to CEA exposure accumulations) are imposed on CEA rod insertions which are below this position and bounded by the TIL. These limits are noted in Table 1.

The TIL is a position limit below the STSSIL which CEA rod insertions must not exceed. This limit is designed to allow for plant maneuvering using CEA insertions (as long as the CEA's do not go below this limit and as long as they maintain the CEA exposure and time limit durations for insertion as previously noted). Should CEA's be inserted below the TIL, the plant annunciator system normally outputs an alarm message and the operator must then take corrective action (such as—restore the CEA rods to within the prescribed limits within a defined time period; or reduce plant thermal power).

It is conventional to identify groups of CEA's beginning with number 1 and proceeding, e.g., to number 5 according to the order in which they are withdrawn from the core in a zero power condition at which all CEA groups are fully inserted. The corollary is that in the initial condition where the reactor core is at full power, with all rods out (the most desirable operating condition), Group 5 is the first to be inserted, followed by 4, 3, etc.

The Long-Term Steady State Insertion Limit is shown in FIG. 20 as a vertical line extending through range of 1.0–0.2 power fraction and (when projected) intersecting the Group 5 insertion representation bar at an insertion distance of 108 inch (274 cm), out of a total group rod length of 150 inches (381 cm). Because Group 4 and subsequent groups follow in staggered relationship, it is clear that whenever Group 5 is positioned in the core anywhere within the Steady State Insertion Limit, no other Groups are in the core. It is evident that Group 4 does not begin entering the core, until Group 5 is at the 60 inch (152 cm) withdrawal position (i.e., 90 inches (229 cm) of insertion).

The Short Term Steady State Insertion Limit for Group 5 is also shown in FIG. 20 as a vertical line which has an upper limit at a power fraction of 0.75 and extends downward to 0.25, and intersects the Group 5 bar at the 60 inch (152 cm) withdrawal position. Thus, it can be appreciated from FIG. 20, that the Group 5 Short Term Steady State Insertion Limit, would not be accompanied by a Short Term Steady State Insertion Limit for any other Group.

On the other hand, the Transient Insertion Limit allows for a variety of CEA insertion configurations including the fifth and fourth Groups fully inserted and the third Group inserted at the 60 inch (152 cm) withdrawal position. Not all configurations are permitted at every power level, however, i.e., the greater extent of Group insertion, the lower the permitted power level even during a transient.

Thus, it may be appreciated that the LCO's impose concurrent limitations on insertion. For example, even if the CEA groups have not reached the limit of 5 EFPD per 30 EFPD interval, for insertion between the LTSSIL and the TIL, desirable repositioning of the Groups may be foreclosed by the further requirement that insertion between the STSSIL and the TIL must not exceed 4 hours per 24 hour interval.

The foregoing operational requirements are presently maintained by manual surveillance. The inventor has concluded that this approach has the following shortfalls which are remedied by the present invention:

1. Manual monitoring is cumbersome and prone to human error.
2. There is no automatic method to display and analyze the monitored data which, in turn, reduces the situational awareness for the operator of the existing accumulated CEA group exposures relative to the operational limits.
3. There is no automatic early notification of approach to operational limits so that corrective action can be taken prior to exceeding an operational limit.
4. There is no automatic alarm notification when the operational limits are exceeded so that corrective action may be immediately initiated.
5. The resolution of the manually recorded data is coarse.
6. Manual recording of accumulated EFPD and hours for CEA rod group exposures does not conveniently lend itself to monitoring a contiguous data interval or window. This may result in the selection of discrete monitoring intervals which are sequential. Such discrete monitoring intervals can lead to potential circumscribing of the intent of the operational limits. For example, the restriction of 5 EFPD per 30 EFPD will seemingly be satisfied by two sequential monitoring intervals in which 4.5 EFPD exposure occurs during the last 4.5 days of the first monitoring interval (of 30 EFPD) and in which 4.5 EFPD exposure occurs during the first 4.5 days of the following monitoring interval (of 30 EFPD). Each monitoring interval seemingly satisfies the restriction of 5 EFPD per 30 EFPD interval but, in fact, 9 contiguous EFPD of exposure have occurred. If the starting period of the first monitoring interval was advanced 5 EFPD, then the total EFPD exposure for the first monitoring interval would have been 9 EFPD (rather than 4.5 EFPD) which exceeds the operational limit. In this example, the operational limits were either complied with or violated depending upon the happenstance of when the start of a discrete monitoring interval was chosen.

SUMMARY OF THE INVENTION

According to the present invention, these deficiencies in conventional techniques are overcome by a method and apparatus, in which the incremental effective exposure for each CEA group is computed commensurate with core power, for each time increment at which each group is within the position range where an administrative limit is imposed. The increments of effective exposures for each group are accumulated, and the accumulated effective exposure for each group is compared with the administrative limit for each group. This comparison is then displayed to the reactor operator.

The displaying of the comparison to the reactor operator, preferably provides for continuous monitoring, alarming, and reporting of accumulated group exposure, expressed in terms of hours and effective full power days relative to the established operational limits. Although the administrative limits are preferably LCO's, other administrative limits, whether or not based directly on the plant Technical Specifications, can provide the applicable limits.

In a further preferred embodiment, the display provides graphical information utilizing a "rolling wheel" and "sliding bar" format.

In a still further preferred embodiment, a display sectoring mode is included.

In yet further embodiments, query and predictive modes of operation, pre-alarm notification upon approach to applicable limits, and alarm notification upon exceeding applicable limits, are also provided.

In the predictive mode, the effect on the LCO's of a planned power maneuver is assessed. If insufficient EFPD margin is available, a projection is made as to when suitable margin will be regained to allow the maneuver to occur while maintaining compliance with the LCO's.

In the pre-alarm feature, an early warning of an indication of approach to an LCO limit regarding accumulated EFPD is displayed, so that action can be taken to avoid an actual violation of the LCO.

The invention is preferably implemented to receive as continuous inputs: the current plant power level; the CEA Group positions; and the operational status of the Core Operating Limit Supervisory System (COLSS). The COLSS determine automatically and on-line, the gross thermal power level of the core. One implementation of such as system is described in U.S. Pat. No. 3,752,735, issued Aug. 19, 1973, and U.S. Pat. No. 4,330,367 issued May 18, 1982, the disclosures of which are hereby incorporated by reference. An internal clock maintains an accurate time base so that plant EFPD may be calculated as a function of the current plant power level, accumulated time, and licensed full power level. Accumulated time (in terms of hours), is also maintained employing the internal clock.

Utilizing the positions of the Regulating and Part Strength rod groups, and the internally calculated EFPD and accumulated time, the system continuously determines the exposure for these groups whenever they are inserted between the Long Term Steady State Insertion Limit and the Transient Insertion Limit. The exposures are determined for contiguous monitoring intervals which are defined by the Limiting Conditions for Operations (see examples in Table 1). The computed exposures are then continuously compared with the operational criteria.

In addition, the positions of the Regulating groups are continuously compared with the Short Term Steady State Insertion Limit whenever the applicable LCO's are exceeded (such as whenever the Core Operating Limit Supervisory System is out of service). For such occurrences, excursions beyond the Short Term Steady State Insertion Limit are annunciated and the time remaining to take corrective action, in accordance to the Technical Specifications for operations, is displayed.

For cases in which the Limiting Conditions for Operation are not applicable (such as for a Reactor Power Cutback event) an inhibit signal prevents unwanted exposure accumulations or spurious alarm messaging. A reactor power cutback system of the type mentioned herein, is described in U.S. Pat. No. 4,075,059 issued Feb. 21, 1978, the disclosure of which is hereby incorporated by reference. It should be appreciated that the use of part strength CEA's is an option, and the implementation of the invention follows the same procedures for part strength CEA's as for regulating CEA's. As the term is used herein, regulating CEA's is meant to include all the Groups which are normally controlled for sequential insertion and removal, as depicted in FIG. 20, for the purpose of regulating power and/or power distribution during power generation in the reactor. The reactor may also have additional control rods which are not normally intended for regulating purposes, but which are available for rapid shutdown or extended zero power outages.

These features of the invention provides significant advantages over conventional techniques.

Automatic calculation and continuous display of accumulated time (hours) and accumulated Effective Full Power Days (EFPD) of CEA rod group exposure relative to the Limiting Conditions for Operation (LCO) for insertion between the Long Term Steady State Insertion Limit and the Transient Insertion Limit, is provided. Real-time monitoring of plant power and CEA rod group positions allows automatic and continuous calculation and updating of Effective Full Power Days and rod group exposures. This simplifies the operator workload and provides timely information relative to monitoring compliance with operational limitations on CEA rod group insertions and assists with the planning of future CEA rod group maneuvers.

Continuous comparison of Regulating rod group positions with the Short Term Steady State Insertion Limit under applicable conditions as noted within the LCO's (such as whenever COLSS is out of service), provides automatic notification of exceeding the Limiting Condition for Operations for Regulating rod groups.

Graphical representation of accumulated time (hours) and Effective Full Power Days (EFPD) relative to the LCO's, utilizing unique "Rolling Wheel" and "Sliding Bar" display formats, is intuitive. The display formats provide the user with an easily understood representation of the accumulated time and accumulated EFPD exposure for CEA rod groups relative to the operational limits as defined by the LCO's. The display formats are designed to accommodate a contiguous monitoring interval in which old exposure data is continuously discarded (rolls off for the "Rolling Wheel" format or slides off for the "Sliding Bar" format) while new data is continuously added (rolls on for the "Rolling Wheel" format or slides on for the "Sliding Bar" format) for the monitoring intervals as defined by the LCO's. These graphical displays provide a spatial representation of accumulated rod group exposure for a contiguous monitoring interval which is readily understandable to the end user. The displays improve the situational awareness and comprehension of the existing accumulated rod group exposures and readily indicates when exposure margin can be regained.

The Sector mode which is associated with the graphical displays allows users to define "sectors" within the "Rolling Wheel" and "Sliding Bar" displays to be expanded and thus examined at higher resolutions. The ability to "sector" to finer resolutions allows finer detail to be observed, for the interval of interest, than can normally be displayed on a Video Display Unit.

The Predictor Mode of operation allows the effect of a planned CEA Rod Group maneuver on the LCO's to be assessed in advance of performing the actual maneuver. This minimizes the likelihood of exceeding the operational limits for CEA rod group exposure. If insufficient time (hours) or EFPD margin is available, the Predictor Mode projects when suitable margin will be regained to allow the maneuver to occur while maintaining compliance with the LCO's. Various "what if" scenarios can be investigated using the Predictor Mode.

The Query Mode allows the user to recall historic information and to determine when a certain level of accumulated exposure (in terms of hours and/or EFPD) will "roll off (slide off)" and be regained as usable margin. This allows the user to review previously recorded information and to determine when accumulated exposure margin (expressed in terms of hours and/or EFPD) will be regained which serves as an advanced planning tool.

In the event of a system outage, the Update mode allows the system to be recalibrated to the current operational conditions. In event of a system outage the Update mode allows the user to enter the appropriate time—power—and rod group exposure history for the outage interval in order to recalibrate the system to the current operational conditions. Thus, the system can account for outages and be immediately reinserted into service when the system is restored to operation.

The Summary Report allows the user to observe the accumulated exposure and remaining exposure margin for all Regulating and part Strength rod groups on a single display. Provides the user with an overall assessment of the current accumulated exposure and remaining exposure margin utilizing a single convenient display page. This alleviates the necessity of searching through multiple display pages to obtain an overall assessment of the current operational status.

The pre-alarm notification alerts the user to an impending approach to an established Limiting Condition for Operation. Advanced notification of an impending limit excursion provides the user with time to take corrective action before the limit is actually exceeded.

Alarm notification alters the user to any excursion beyond an established LCO boundary. Such alarming alerts the operator that an operational limit has been exceeded to that he may take appropriate action as called forth within the Technical Specifications for plant operations.

Time remaining for completion of corrective action is displayed whenever an Alarm is annunciated (via exceeding an LCO boundary). Display of such information provides the operator with a convenient assessment of the progress of corrective action(s) relative to requisite "Completion Times" as stated within the Technical Specifications for plant operation.

In cases for which the Limiting Conditions for Operation are not applicable (such as for a Reactor Power Cutback event) an inhibit signal prevents unwanted exposure accumulations or spurious alarm messaging.

A contiguous monitoring interval is maintained for calculating rod group exposure relative to the LCO's for insertions between the Long Term Steady State Insertion Limit and the Transient Insertion Limit, rather than sequential discrete intervals. A contiguous monitoring interval avoids potential ambiguity in determining compliance with the LCO's.

BRIEF DESCRIPTION OF THE DRAWINGS

These and other features and advantages of the invention will be described in the context of the preferred embodiment, with reference to the accompanying drawings, in which:

FIG. 23 illustrates a summary report display according to the invention.

DESCRIPTION OF THE PREFERRED EMBODIMENT

Figure 1:
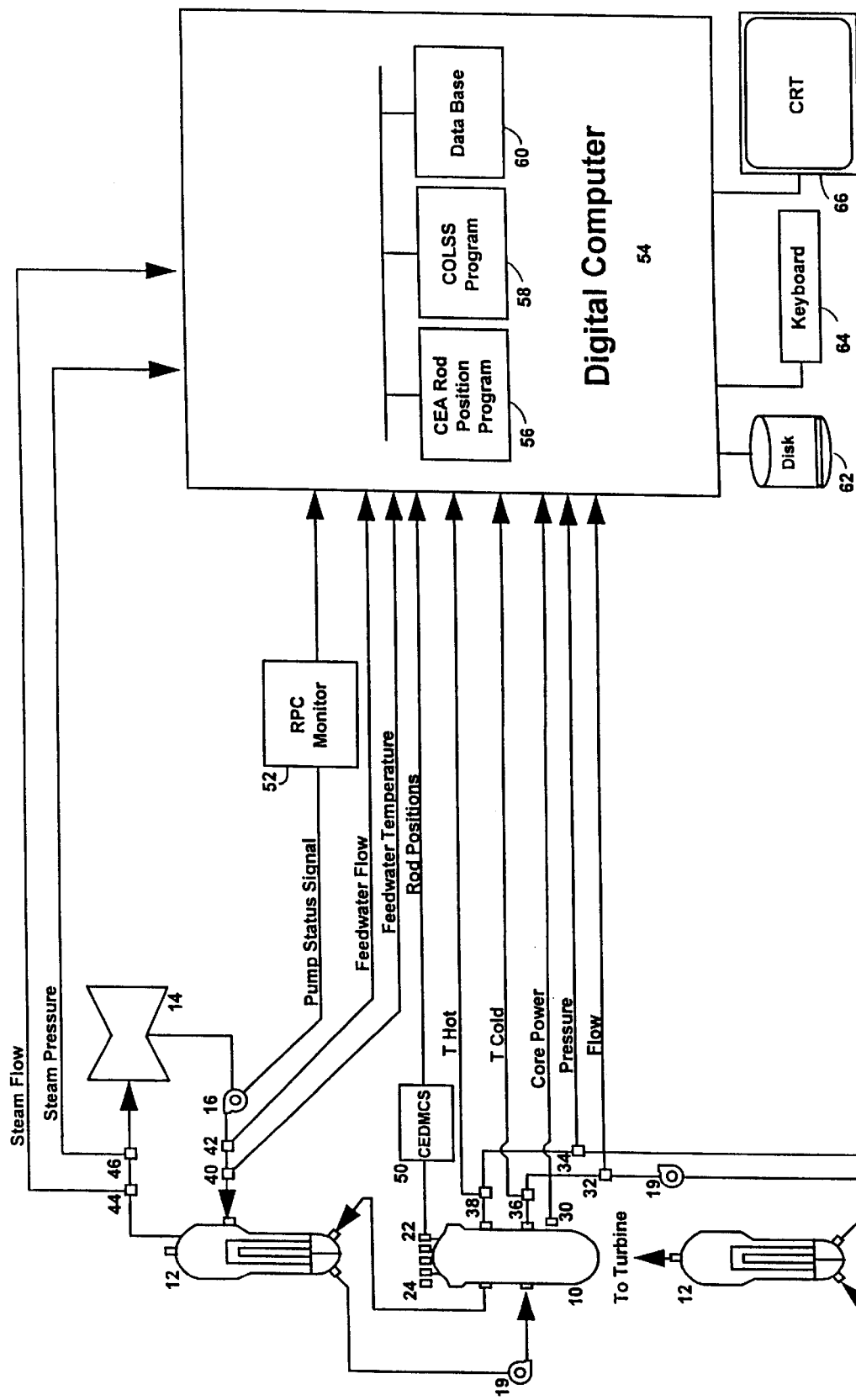
FIG. 1 is a diagrammatic illustration of the CEA rod position system according to the invention, implemented in a pressurized water nuclear reactor NSSS.

FIG. 1 is a diagrammatic illustration of the CEA Rod Position System in accordance with the present invention, for a pressurized water nuclear reactor. The reactor is controlled by CEA's which are actuated by drive mechanisms 22 which, in turn, are controlled by a Control Element Drive Mechanism Control System (CEDMCS) 50 (or equivalent rod control system). During operation of a pressurized water reactor, the coolant is circulated through the reactor core, contained within the nuclear rector vessel 10, which extracts heat from the core and heats the coolant. This heated primary coolant is then passed through a steam generator 12 where it exchanges its heat with a secondary coolant that circulates through the secondary side of the steam generator 12. After transferring its heat to the secondary coolant, the primary coolant is then recirculated by reactor coolant pumps 19 back to the reactor 10.

The secondary coolant, which is ordinary water, is heated from its normal liquid phase to vapor phase as a consequence of the heat transfer from the primary coolant which occurs in the steam generators 12. It is then passed to the plant turbine 14 which converts the heat energy of the vaporous phase into mechanical energy. The secondary coolant is then condensed and is recirculated to the steam generator 12 by means of steam generator feedwater pumps 16.

A digital computer 54 receives certain plant input signals and then processes them to perform the requisite on-line monitoring of CEA Regulating and Part Strength rod groups relative to the Limiting Conditions for Operation (LCO) for insertion between the Long Term Steady State Insertion Limit and the Transient Insertion Limit. In order to properly perform this function, the digital computer 54 requires the CEA rod positions for the Regulating and Part Strength rods, indications if a reactor power cutback condition is present, and the values of certain plant parameters.

The CEA rod positions are obtained from the Control Element Drive Mechanism Control System (CEDMCS) 50 (or equivalent rod control system). The CEDMCS determines rod positions for each Control Element Assembly by keeping an aggregate count of the number of "up" and "down" pulses which are generated by CEDMCS whenever a request is sent to move the rods up or down by one position (e.g. −0.75 inches or 1.9 cm of vertical displacement) to the control rod control mechanisms 22. These signals are generated within CEDMCS by an Automatic CEA Timing Module (ACTM) which outputs "up" and "down" pulses of 300 to 500 millisecond duration. The "up" and "down" pulses are accumulated within CEDMCS via pulse counters for each of the rods. The rod positions are determined within CEDMCS by taking the difference in aggregate pulse counts between the "up" and "down" pulses and multiplying this difference by the vertical displacement due to a single pulse command.

Rod Position=(S{up pulses}−S{down pulses})×0.75 inch

Pulse counters are reset to zero whenever a rod is fully inserted into the core and encounters a "bottom contact"

switch. The individual CEA rod positions, as determined via CEDMCS pulse counting, are transmitted from CEDMCS 50 to the digital computer 54 via a data link. These values are then stored in the plant computer data base 60 where they are accessible by the CEA Rod Position Program 56.

Alternately, rod positions can be directly determined via a control rod position detector 24 which is common to pressurized water nuclear reactors.

Indication of the initiation of an accelerated power reduction, known as Reactor Power Cutback (RPC), is determined by the RPC Monitor 52. The RPC Monitor notes whenever an event is present which requires an accelerated power reduction (such as the failure of a steam generator feedwater pump 16) and sends a signal to the digital computer 54 indicating that a RPC event is present. The status of the RPC condition (RPC event present or not present) is stored in the plant computer data base 60 where it is accessible by the CEA Rod Position Program 56.

Certain plant parameter values are required by the digital computer 54 in order for the COLSS program 58 to calculate the reactor power level. These values are obtained from the plant sensors as follows: primary coolant flow rate 32, primary coolant pressure 34, cold leg temperature (T cold) 36, hot leg temperature (T hot) 38, feedwater temperature 40, feedwater flow 42, steam flow 44, and steam pressure 46. These values are then stored in the plant computer data base 60 where they are accessible by the COLSS program 58 (or equivalent). COLSS 58 utilizes this data to determine plant power by determining the net energy leaving a control volume taken out of the reactor (primary calorimetric method) and by performing an energy balance based on the plant secondary system (secondary calorimetric method). Alternately, plant power may be directly determined via the neutron flux detectors 30 which are common to pressurized water nuclear reactors.

The COLSS program 58 computes plant power and stores this value along with the COLSS program status (operating mode, off-line mode, test mode) into the computer data base 60 where it can be accessed by the CEA Rod Position Program 56.

The CEA Rod Position Program 56 determines if the restrictions imposed upon CEA rod group insertions between the Long Term Steady State Insertion Limit and the Transient Insertion Limit (expressed in terms of hours and EFPD exposure) are maintained. This program acquires individual rod positions (as determined via CEDMCS 50) from the data base 60, acquires the LCO limits for CEA insertion from the data base 60, acquires RPC status (as determined via the RPC monitor 52) from the data base 60, and acquires the value of plant power and COLSS status (as determined via COLSS 58) from the data base 60. A magnetic data storage disk 62 (or equivalent long term data storage device) is used to store CEA exposure files and CEA historic records which are utilized by the CEA Rod Position Program 56. A keyboard 64 accepts operator inputs and a CRT 66 displays output data and alarm annunciation messages. (Alternate data entry and display devices, such as touch screens and LCD flat panel displays, may also be utilized in place of the CRT and keyboard.)

Positions for the Regulating Groups and Part Strength Groups, as used in the CEA Rod Position Program 56, are determined by the "Middle Group Average" method. This method eliminates the highest and lowest CEA's from the averaging calculation so that the group average position is based on the "middle" CEA positions, and is not skewed by an unusually high or low individual CEA element position. This method is illustrated below for the case of Regulating Group 1 which consists of "n" CEA elements whose positions are stored in array RG1(J). The calculation proceeds as follows:

$$P1\text{min} = \text{Min}\ (RG1(1), RG1(2), \ldots RG1(n))$$

$$P1\text{max} = \text{Max}\ (RG1(1), RG1(2), \ldots RG1(n))$$

$$P1\text{sum} = S\{RG1(j)\},\ j = 1\ \text{to}\ n$$

$$RG1\_Position = (P1\text{sum} - P1\text{min} - P1\text{max})/(n-2)$$

Where:
"P1min" contains the value of the lowest CEA position for Reg Group 1;
"P1max" contains the value of the highest CEA position for Reg Group 1;
"P1sum" contains the sum of all CEA rod positions for Reg Group 1;
"n" contains the number of CEA elements in Reg Group 1;
"RG1_Position" is the average position of Regulating Group 1 as determined by the "Middle Group Average" method.

These calculations may be performed within the data base using "composed data base points" (in which the aforementioned calculations are performed directly within the data base), or alternately, can be performed as a separate CEA group position module associated with the CEA Rod Position Program 56.

Figure 2:
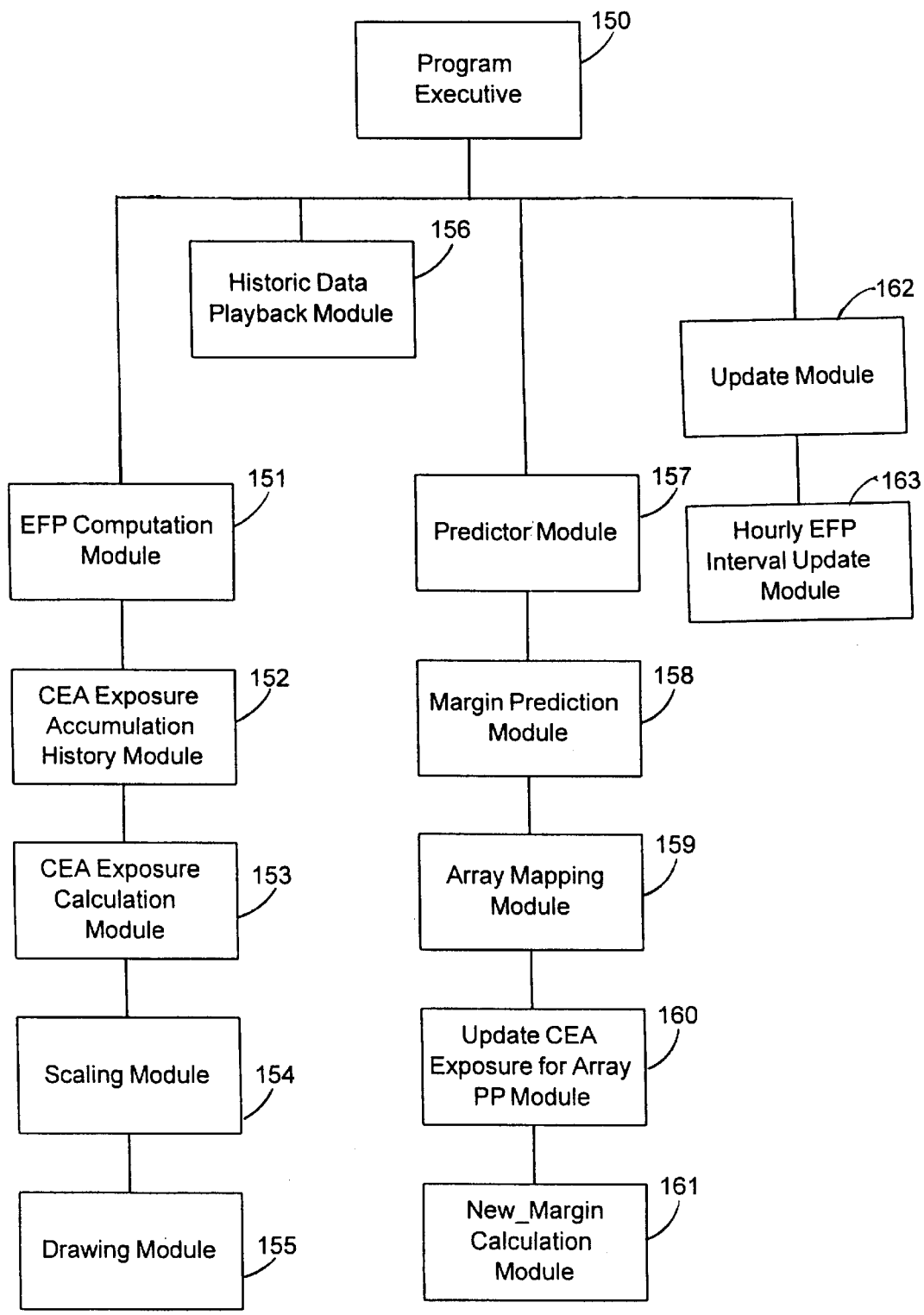
FIG. 2 is a schematic overview of the logic associated with the invention as depicted in FIG. 1.

FIG. 2 provides an overview of the software structure for the CEA Rod Position Program 56 for the key operating functions. Box 150 is the Program Executive which controls and schedules the execution of the other program modules which comprise the CEA Rod Position Program (The specific instructions contained therein are dependent upon the particular software operating system which is employed by the digital computer). Box 151 performs a calculation of Effective Full Power periods and then sequentially calls the next four modules (boxes 152 to 155) in the chain. Box 152 performs an update of the CEA exposure accumulation history for all Regulating and Part Strength groups, box 153 performs a determination of the current value of CEA exposure for all Regulating and Part Strength groups, box 154 scales the exposure accumulation data so it conforms to the pixel display constraints of the display CRT, and finally box 155 draws the graphical output in either "rolling wheel" or "sliding bar" display formats. Box 156 supports the recall of historic CEA exposure accumulation records. Box 157 contains the main Predictor Module which predicts when sufficient CEA exposure margin will be regained to allow a planned CEA rod maneuver without violating the LCO's. Boxes 158 to 161 contain software modules which support additional calculations that are required for the Prediction Function. Box 158 performs margin prediction calculations, box 159 performs a mapping of CEA exposure history from array "P(J)" (which contains the current CEA exposure data) into array "PP(J)" (which is utilized for exposure history prediction calculations), box 160 updates the CEA exposure margin for the predictor array "PP(J)", and box 161 calculates CEA exposure margin using the predictor array "PP(J)". Box 162 contains the main update module which is used to update time dependent CEA exposure data in the event of a computer outage of the CEA Rod Position System. After execution of box 162, then box 163 is called. Box 163 performs additional calculations on the update intervals (by shifting elements of array "P(J)" up by 1 position) that are required to support the Update Function. The detailed functional operation of these software modules is subsequently described herein.

Prior to describing the requisite logic associated with this system, an understanding of the data storage structure is a helpful prerequisite in order to follow the subsequent algorithmic functions which operate directly upon the stored data. The following descriptions are provided for the case utilizing data storage intervals based upon Effective Full Power (EFP) criteria (EFP hour intervals) rather than standard time intervals (hours) as these are the more complex data recording intervals to maintain. (For criteria based on standard time intervals (hours), the array elements correspond to "hours" instead of "EFP hours" and there is no correspond calculation required to determine "EFP hourly intervals".)

Figure 3:
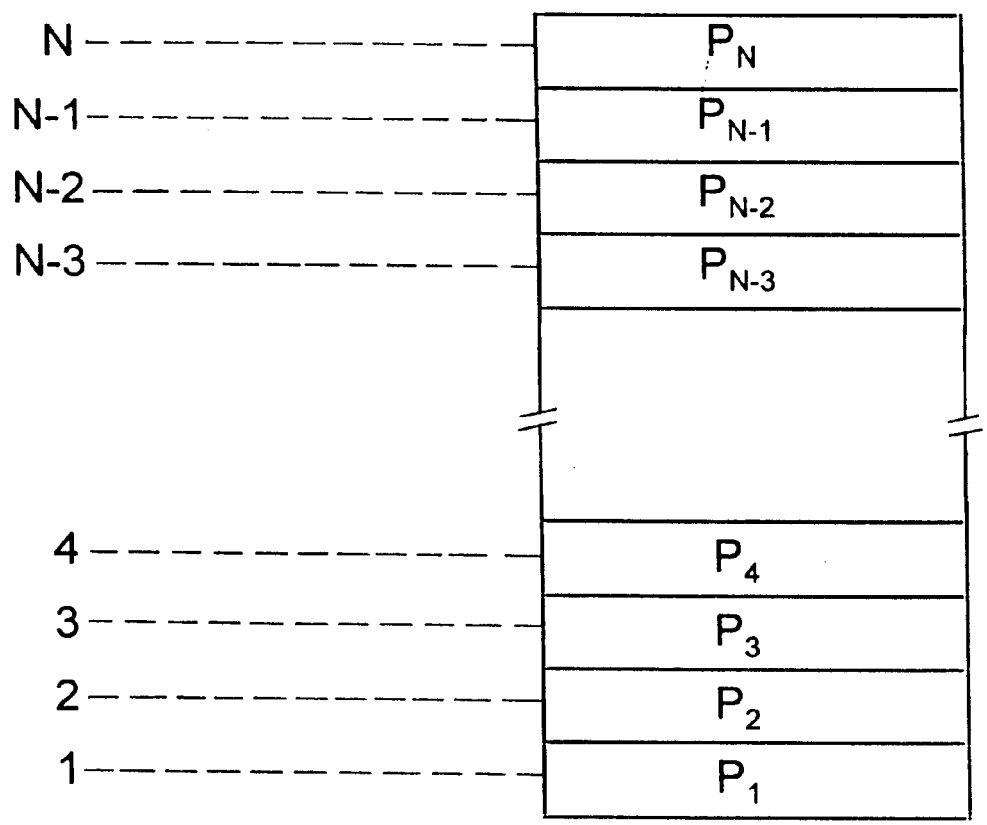
FIG. 3 illustrates a generic data array structure for maintaining the CEA exposure records as utilized in the present invention.

FIG. 3 illustrates a generic data array structure for maintaining the CEA exposure records. There are multiple arrays to track each of the CEA exposure criteria (e.g. –5 EFPD per 30 EFPD interval for Regulating groups, 14 EFPD per 365 EFPD interval for Regulating groups, 7 EFPD per 30 EFPD interval for Part Strength groups, etc.). Each of the Regulating and Part Strength groups has a corresponding set of such arrays to track the requisite CEA exposures. Each of these arrays consists of N elements. The number of elements (N) is dependent upon the CEA exposure which is being maintained (e.g. –5 EFPD per 30 EFPD interval for Regulating groups, etc.). Each element in an array corresponds to a fixed Effective Full Power (EFP) interval of exposure, with element 1 corresponding to the most recent EFP interval and element N corresponding to the oldest EFP interval.

As an example, for the "5 EFPD per 30 EFPD interval" criteria for Regulating groups, and utilizing an EFP data recording interval of 1 EFP-hour, a total of 1*24*30=720 array elements would be required to contain 30 days worth of EFP exposure, recorded at a resolution of 1 EFP-hourly intervals. For this array, element N=720 would correspond to the oldest data (720 EFP-hours old) while element N=1 would correspond to the most recent data (1 EFP-hour old)). EFP-hourly intervals are computer based upon plant power operating level and time duration (for example—with a plant power level of 0.5 EFP, a two hour time interval would be required to obtain a 1 EFP-hour interval). The contents of each array element indicate what the CEA exposure accumulation was for the CEA group during the EFP-hourly interval that the array element corresponds to. If CEA exposure accumulation occurred during an EFP interval, then the total exposure accumulation which occurred during that interval is stored as the array element value; otherwise a "0" is stored (for example, if a Regulating group was inserted between the Long Term Steady State Insertion Limit and Transient Insertion Limit for ½ the time during the EFP hourly period that occurred 4 EFP hours ago, then the contents of array element N=4 would be "0.5 EFP hour", i.e., P(4)=0.5).

Figure 4:
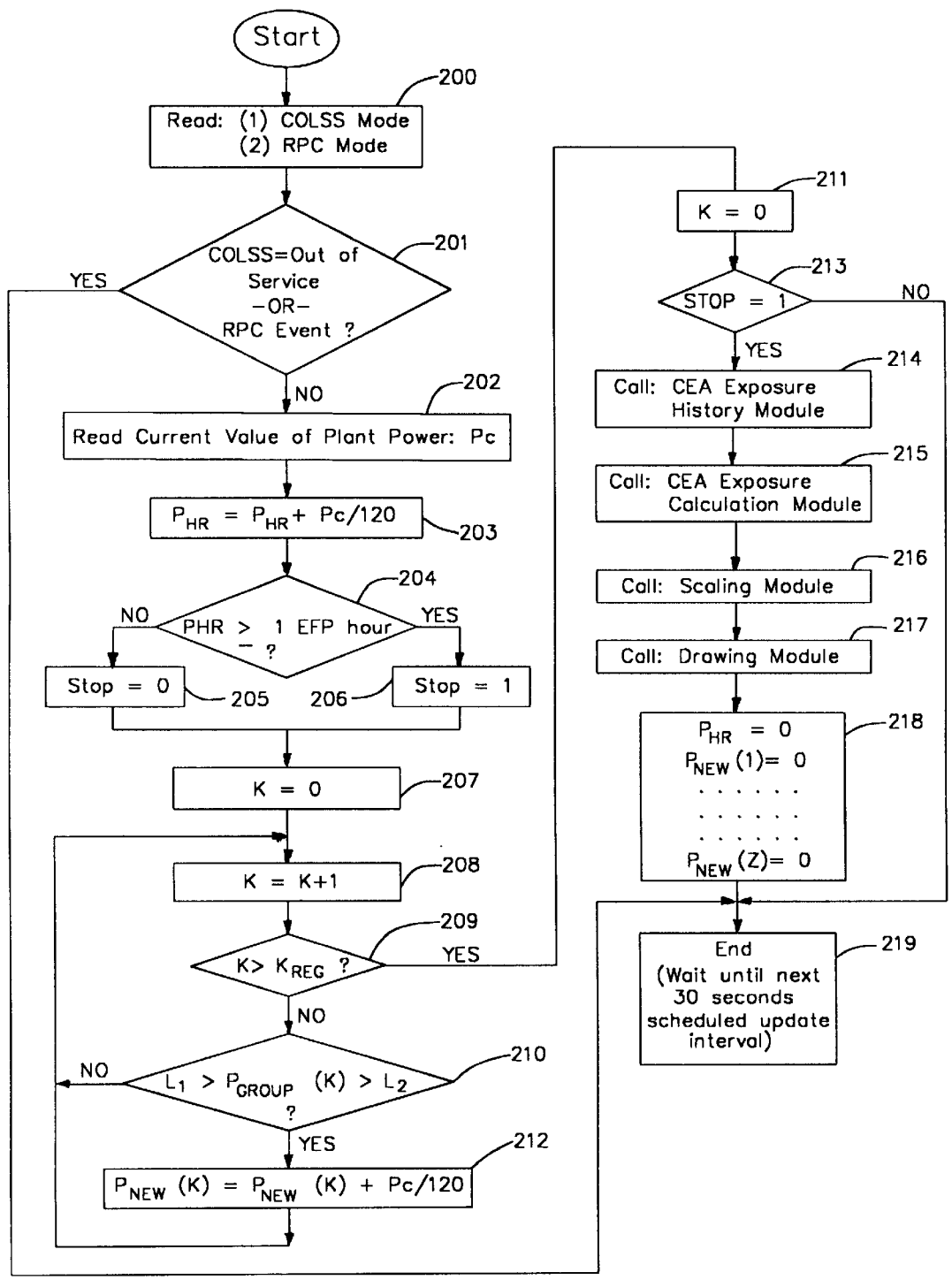
FIG. 4 is a flow diagram representing the logic associated with the EFP computation module represented in FIG. 2.

FIG. 4 provides a flowchart representation of the EFP COMPUTATIONAL MODULE which is utilized to determine Effective Full Power (EFP) hourly intervals and to determine the EFP exposure which has occurred during these intervals. This module runs periodically, at 30 second intervals, under the direction of the PROGRAM EXECUTIVE (other time intervals may be utilized if increased resolution in computing the 1 EFP-hour interval is desired).

With reference to FIG. 4, the EFP COMPUTATIONAL MODULE initially reads the current status of COLSS and Reactor Power Cutback via box 200. Then, via box 201, it determines if COLSS is out of service (determined via the COLSS module, box 58 of FIG. 1) or if a Reactor Power Cutback condition exists (determined via the RPC Monitor, box 52 of FIG. 1). If either of these conditions is present, the module bypasses the computation of an EFP interval and waits until the next 30 second scheduled execution interval. If COLSS is in service and there is no current Reactor Power Cutback condition, the present value of plant reactor power is read at box 202. Then, via box 203, this is divided (normalized) by the sampling interval for this variable ($\frac{1}{120}$ hour which corresponds to the 30 second scheduled program execution rate) and then summed with variable "Phr" which is used to accumulate the 30 second 'normalized' values of plant reactor power ("Phr" is set to zero as an initiation task upon program bootup and is reset to zero after each 1 EFP-hour period is calculated, by box 218). Boxes 204 to 206 next determine if the accumulated value of "Phr" is equal to or greater than a 1 EFP-hour interval and if true sets variable STOP to 1, or if not true sets variable STOP to 0. Then boxes 207 to 211 determine if the positions of each of the Regulating Groups and Part Strength groups (a total of 'Kreg' such positions which are contained in array "Pgroup (k)") lie between the Long Term Steady State Insertion Limit (L1) and the Transient Insertion Limit (L2). For such groups, box 212 then updates the corresponding EFP exposure by accumulating the current EFP normalized value for this interval in array "Pnew(k)" (Array "Pnew(k)" is set to zero as an initiation task upon program bootup and is reset to zero after each 1 EFP-hour period is calculated, by box 218). Box 213 next determines if a 1 EFP-hour interval has occurred (this occurs when STOP=1). If this is true, box 214 performs a call to the CEA EXPOSURE ACCUMULATION HISTORY MODULE to update the CEA exposure history, box 215 performs a call to the CEA EXPOSURE CALCULATION MODULE to update the current value of CEA exposure, box 216 performs a call to the SCALING MODULE to scale the graphical outputs to fit within the pixel constraints of the CRT screen, box 217 performs a call to the DRAWING MODULE to draw the graphical display on the CRT, and then box 218 resets variable "Phr" and the elements of array "Pnew(k)" to zero for use during the next 1 EFP-hour interval calculation. The program then terminates. If box 213 determines that 1 a EFP-hour period has not yet occurred, then the calculation for this 30 second period terminates. In either case, after the program terminates the PROGRAM EXECUTIVE schedules this module for execution again during the next periodically scheduled 30 second interval (box 219).

Figure 5:
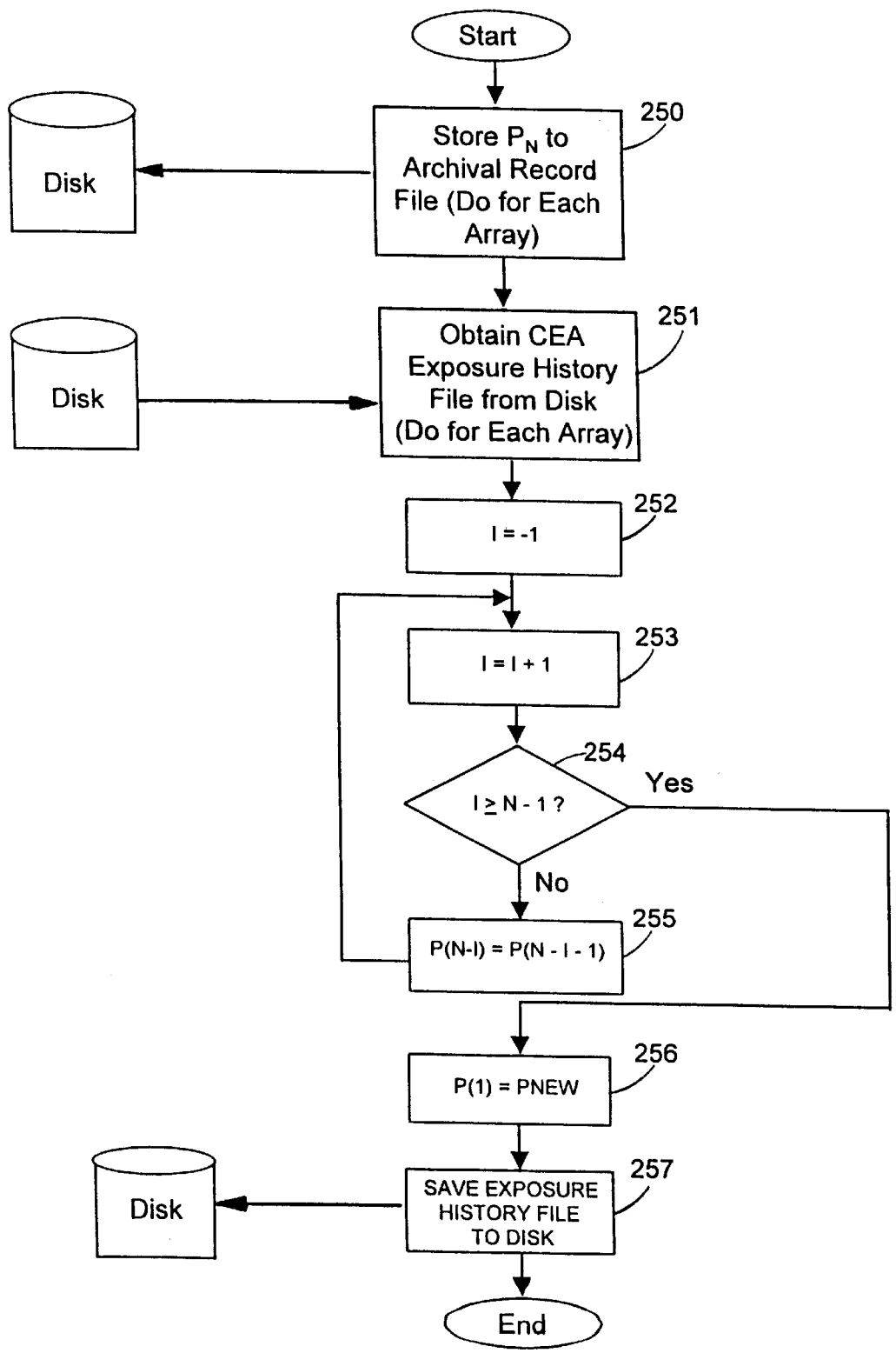
FIG. 5 is a flow diagram representing the logic associated with the CEA exposure accumulation history module shown in FIG. 2.

FIG. 5 depicts the functional logic for the CEA EXPOSURE ACCUMULATION HISTORY MODULE. This module is called by the EFP CALCULATION MODULE if condition STOP=1 is true. This modules updates the CEA exposure for the CEA Exposure Data Arrays. When called, this module shifts up by one position each element in the CEA Exposure Array (for each of the Program arrays). Thus, the latest CEA exposure which occurred during the previous 1 EFP-hour interval is moved into the first array position, the CEA exposure from the first array position is moved into the second array position, etc. until all CEA exposure data has been shifted up 1 EFP-hour interval in the array. The value of CEA exposure from the last array element "N" (which represents the oldest CEA exposure data) is removed from the array since it is now beyond the LCO EFP duration criteria. This value is stored in the archival records file (where it can be accessed as historical data in conjunction with the HISTORICAL DATA PLAYBACK MODULE which is discussed further below).

Figure 6:
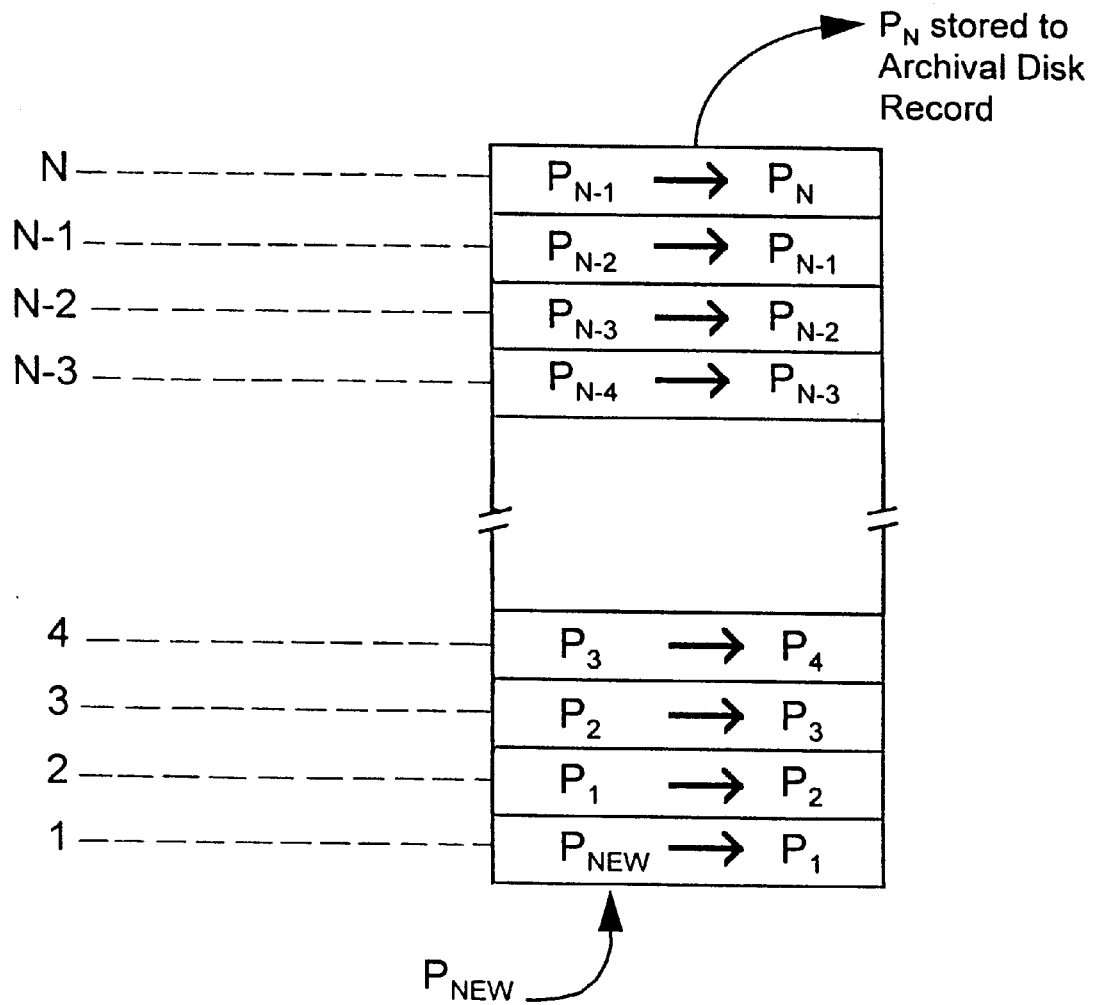
FIG. 6 is a schematic of data handling associated with the CEA exposure accumulation module in FIG. 5.

This process of shifting the contents of each array element up by one position is illustrated in FIG. 6. It is this process whereby a "contiguous monitoring interval" is maintained. For simplicity, the logic for the CEA EXPOSURE ACCUMULATION HISTORY MODULE is illustrated for the case of a single program array (Each of the program arrays, which correspond to the CEA Exposure criteria for each of the Regulating and Part Strength Groups, is similarly operated upon).

Referring again to FIG. 5, box 250 first stores the oldest value of "Pn" (from array element N) to the CEA exposure archival file which is contained on disk. The value of "Pn" is saved along with a time stamp that notes the year, date and time that the point was recorded. Box 251 then obtains the CEA Exposure Accumulation History file from the digital computer disk (item 62 on FIG. 1). Boxes 252 to 255 then shift up the contents of the data array elements, beginning from the last array position (that is, first the contents of array element "N-1" is shifted into array position "N", then the contents of array element "N-2" is shifted into array position "N-1", etc.) until array element 1 (the last shift performed by boxes 252 to 255 is from array position 1 to array position 2). After the contents of array position 1 is shifted into position 2, box 256 inserts the value of "Pnew" (the most recent calculated value of CEA Exposure as determined via the EFP Calculation Module) into array position 1. A time stamp is also saved which notes the year, date and hour in which the value of Pnew was determined (this time stamp is utilized when recalling archived historical CEA exposure records). Box 257 then saves the updated CEA Exposure History file to disk storage (via the digital computer disk, item 62 on FIG. 1). The process is repeated until all program arrays are similarly operated upon.

For increased computational efficiency, the actual computer implementation of the above process may utilize "circular data storage buffers" for the CEA Exposure Arrays. The shift of positions would then occur by overwriting the oldest CEA exposure value with the newest value and then incrementing software "pointers" which indicate the array starting position (array element=1) and the array ending position (array element=N) within the circular data storage buffer. Thus, the shifting up of the each array element by one position is accomplished with a minimum set of software steps which reduces the computational impact on computer processing resources. The actual logic which would be utilized with circular data storage buffers is dependent upon the chosen hardware/software and is therefore not depicted here.

Figure 7:
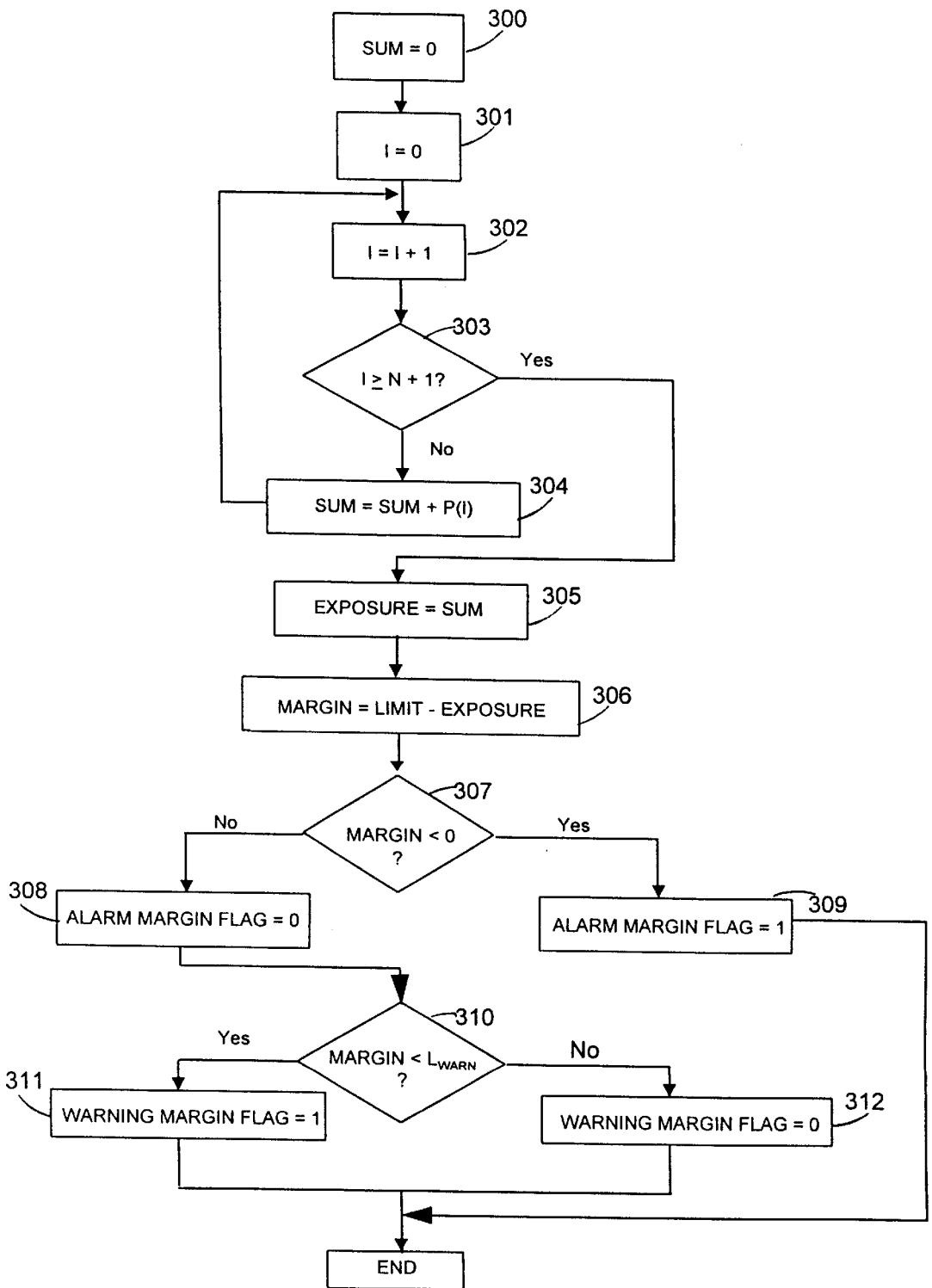
FIG. 7 is a flow diagram representing the logic associated with the CEA exposure calculation module of FIG. 2.

FIG. 7 depicts the functional logic for the CEA EXPOSURE CALCULATION MODULE. This module is called by the EFP CALCULATION MODULE if condition STOP=1 is true. This module updates the CEA exposure for each of the CEA Exposure Data Arrays. For simplicity, the logic for this module is illustrated for the case of a single program array—however, all such aforementioned data arrays are similarly processed. Boxes 300 to 304 calculate the current value of CEA exposure by summing the contents of the CEA Exposure Data Array ("P(I)") in which each array element contains the value of CEA exposure for a given 1 EFP-hour interval. The total accumulated CEA exposure is then stored in variable "EXPOSURE" via box 305. The module then determines the CEA exposure margin ("MARGIN") in box 306 by calculating the difference between the Exposure Limit (such as 5 EFP days) which is stored in variable "LIMIT" and the current value of CEA exposure which is stored in variable "EXPOSURE". Boxes 307 to 309 next determine if there is positive margin (MARGIN>0) or negative margin (MARGIN<0). If the CEA exposure margin is negative (MARGIN<0) then the Alarm Flag is set to one (1) and an alarm is annunciated, alerting the operator that a CEA exposure technical specification has been violated. If the CEA exposure margin is positive (MARGIN>0) then the "Alarm Flag" is set to zero and the CEA exposure margin is further tested by boxes 310 to 312 to determine if the remaining CEA exposure margin ("MARGIN") is less than the pre violation warning limit ("Lwarn"). If the remaining CEA exposure margin ("MARGIN") is less than the pre violation limit (MARGIN<Lwarn), then "Warning Margin Flag" is set to one (1) and a "pre violation CEA exposure" alarm is annunciated, alerting the operator that he is approaching the CEA exposure LCO. If the remaining CEA exposure margin ("MARGIN") is greater than the pre violation limit (MARGIN>Lwarn), then "Warning Margin Flag" is set to zero (0) and no alarm annunciation occurs.

Figure 8:
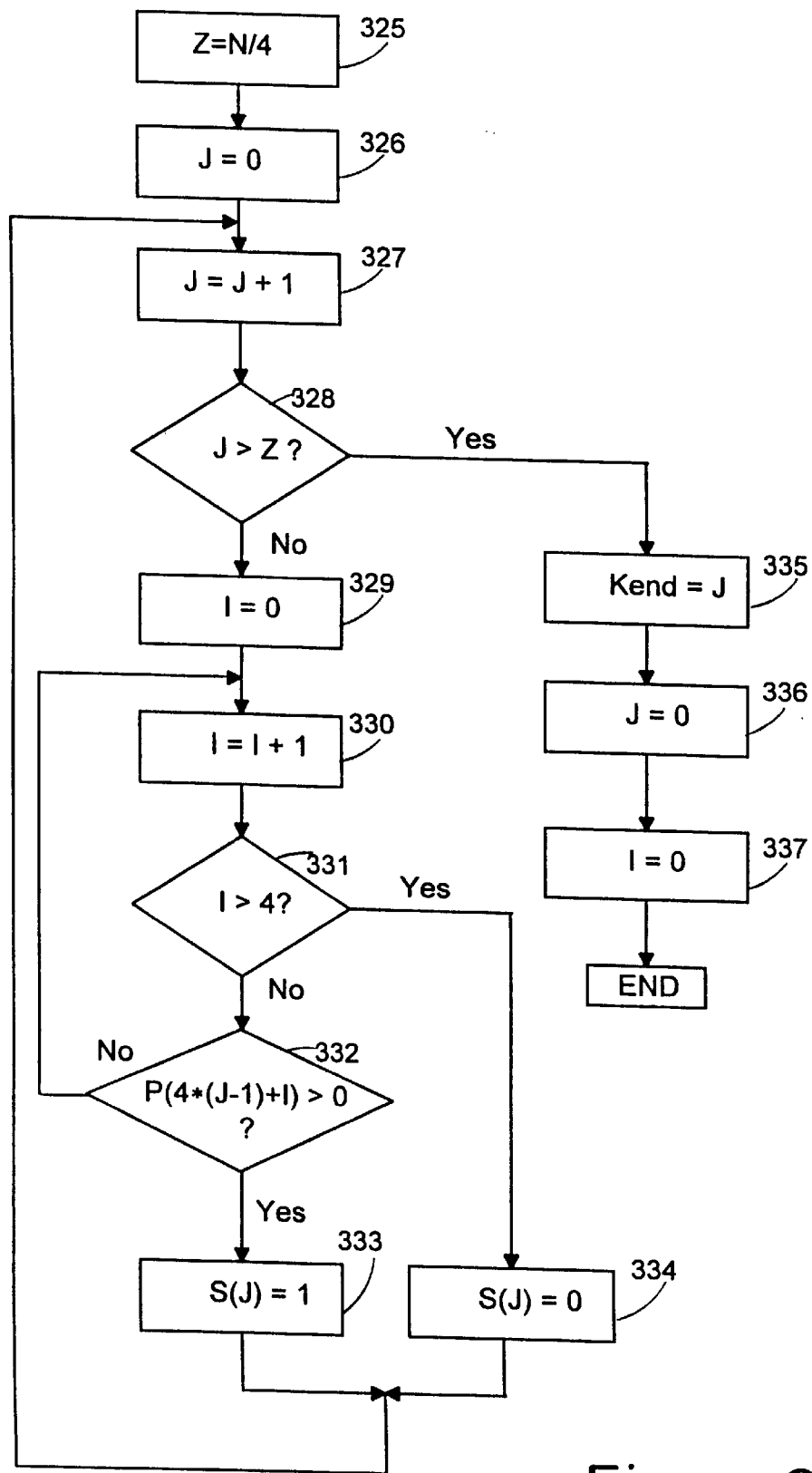
FIG. 8 is a flow diagram representing the logic associated with the scaling module indicated in FIG. 2.

The logic for the SCALING MODULE is provided in FIG. 8. For simplicity, the logic for this module is illustrated for the case of a single program array—however, all data arrays associated with the CEA Rod Position System are similarly processed. This module is called by the EFP CALCULATION MODULE if condition STOP=1 is true. The SCALING MODULE performs a scaling of the CEA Exposure Accumulation Array Elements so that they may be pictorially represented on the CRT (item 66 on FIG. 1) in "rolling wheel" or "sliding bar" formats. The scaling is necessary in order to accommodate the CEA exposure accumulation array information within the pixel constraints imposed by the CRT. The SCALING MODULE examines an interval of CEA exposure accumulation data (such as every 4 consecutive EFP-hourly periods) as stored in the CEA Exposure Accumulation Array Elements (4 consecutive array elements) and determines if any of the array elements within that interval indicate that a CEA exposure accumulation has occurred. If there is any CEA exposure accumulation for the examined interval, the SCALING MODULE then updates a corresponding array (CEA Scaling Array) which is used to drive the output graphics on the CRT. The CEA Scaling Array consists of elements that correspond to each examined interval (such as 4 consecutive EFP-hourly periods) from the CEA Exposure Accumulation Array Elements (that is, 4 consecutive array elements from the CEA Exposure Accumulation Array are mapped into a single array element in the CEA Scaling Array). For cases in which there has been CEA exposure during the examined interval, the SCALING MODULE updates the corresponding array element in the CEA Scaling Array with a one (1), elsewise with a zero (0). The CEA Scaling Array is subsequently utilized by the drawing module to draw either a solid or blank picture segment (depending on the store value in the CEA Scaling Array element—either "1" or "0") for the "rolling wheel" or "sliding bar" output display formats.

Figure 9:
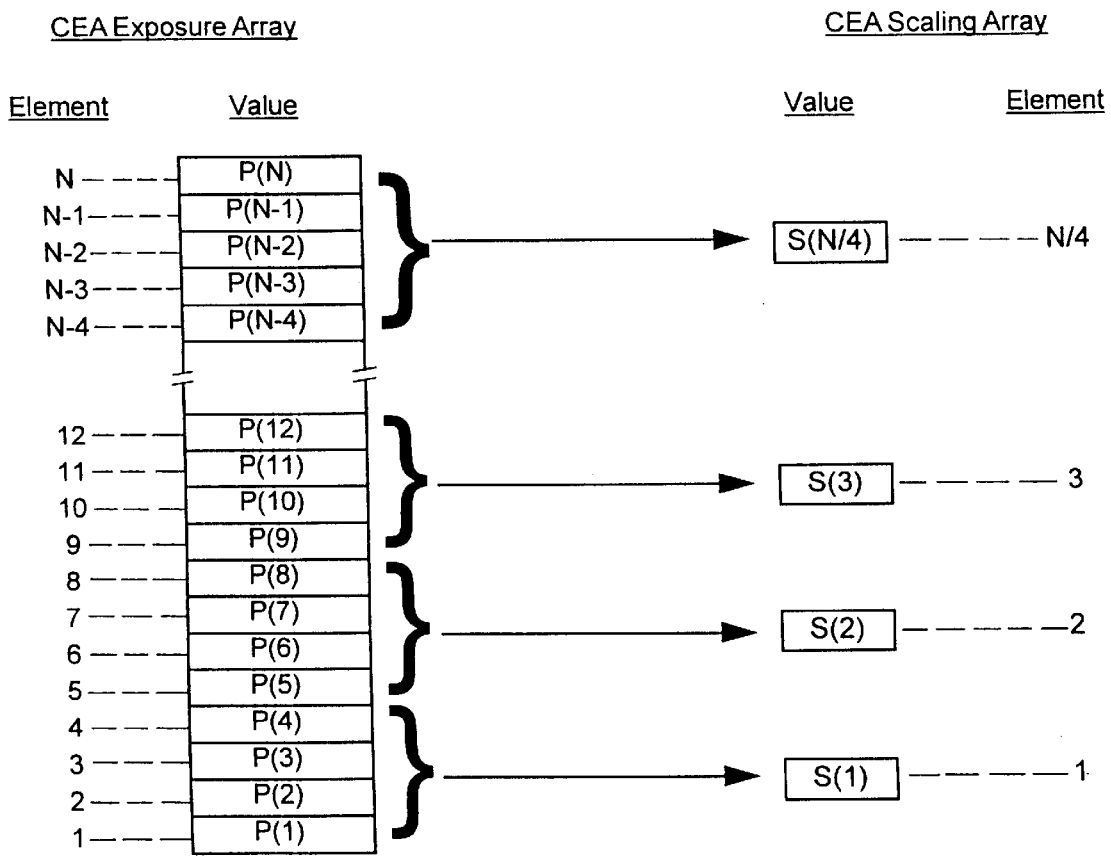
FIG. 9 is a schematic illustrating the assignment of values for certain of the variables associated with FIG. 8.

FIG. 9 illustrates the correspondence between the CEA Exposure Accumulation Array and the CEA Scaling Array.

With reference to FIG. 8, boxes 325 and 326 initialize the computation elements for this module. Variable "Z" is set to "N/4" where "N" corresponds to the number of elements in the CEA Exposure Accumulation Array. In this particular case, the SCALING MODULE will scan intervals corresponding to 4 EFP-hours, which corresponds to four consecutive array elements in the CEA Exposure Accumulation Array. Boxes 327 and 328 are used to determine when all such 4 EFP-hour intervals in the CEA Exposure Accumulation Array have been examined (since there are "N" array elements in the CEA Exposure Accumulation Array, then there are Z=N/4 such intervals). Boxes 329 to 332 are used to examine four consecutive array elements in the CEA Exposure Accumulation Array (which corresponds to an interval of 4 EFP-hours). Box 332 determines if any of the four consecutive array elements in the CEA Exposure Accumulation Array contain any CEA exposure accumulation. It performs this determination by examining the contents of each array element for a non-zero value of CEA exposure accumulation (P(4*(J−1)+I)>0). If any four consecutive array elements in the CEA Exposure Accumulation Array contain a non zero value, then the corresponding element S(J) of the CEA Scaling Array is updated with a one (1) via box 333, elsewise box 334 updates element S(J) with a zero (0). When box 328 determines that all of the elements of the CEA Exposure Accumulation Array have been examined it then resets variables "J" and "I" via boxes 336 and 337 and sets variable "Kend" to the value of variable "J" via box 335. Variable "Kend" is subsequently used by the DRAWING MODULE. This process of assigning values to array S(J) based on examining the contents of four consecutive elements of array P(N) is illustrated in FIG. 9.

Since the CRT has limited pixel resolution relative to the data which is stored in the CEA Exposure Accumulation Array (in this case CEA exposure will be displayed with a granularity of 4 EFP hour intervals), the pictorial displays will have greater "granularity" than the numeric data which is output on the display pages. However, the resolution is still considered sufficient to indicate, pictorially, the relative periods in which CEA exposure accumulation occurred. The numeric data, as output via the normal displays, will always contain the exact values of CEA exposure and the PREDICTOR MODULE will always output when CEA exposure margin will be regained; with a time resolution to the nearest hour.

Figure 10:
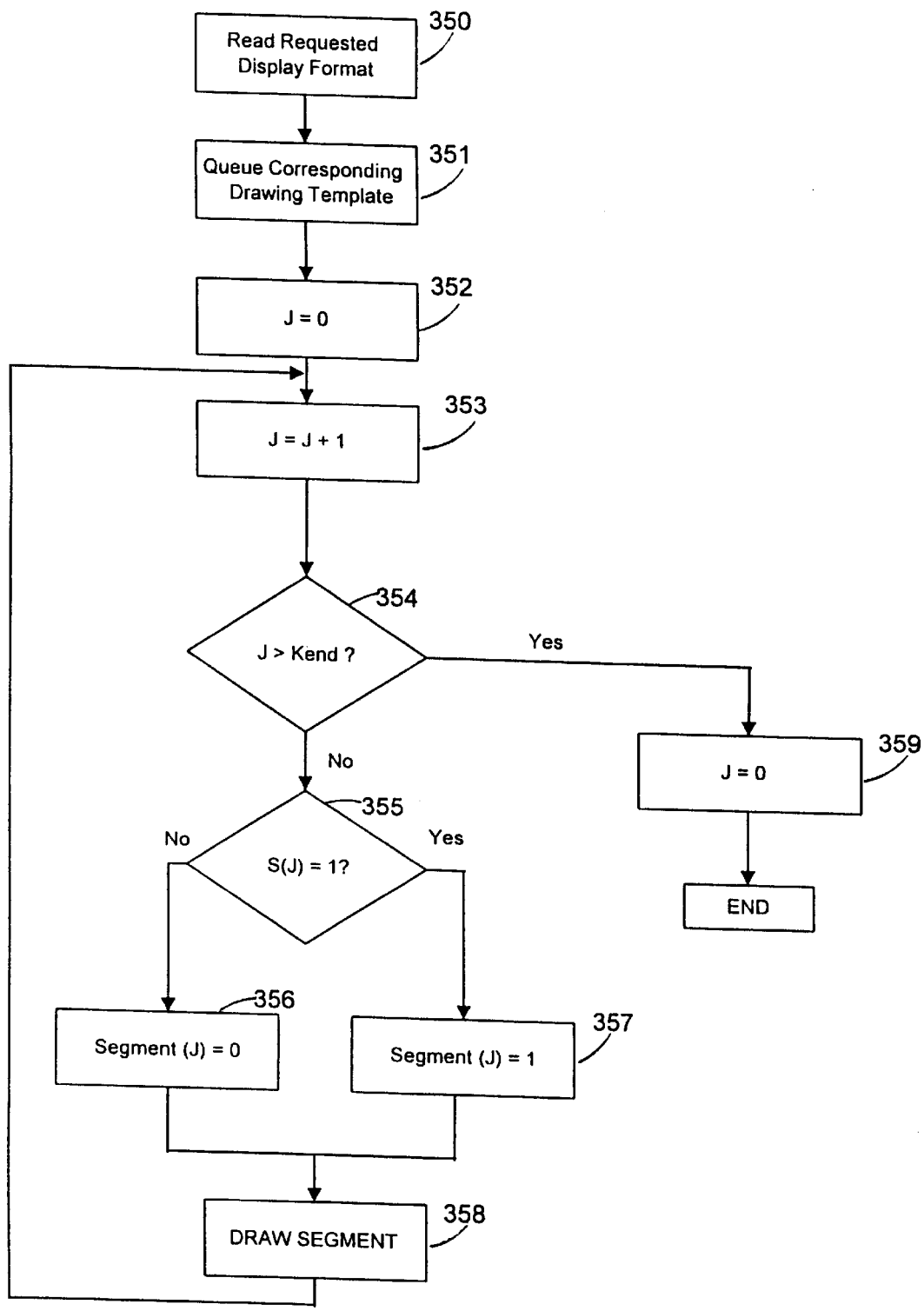
FIG. 10 is a flow diagram representing the logic associated with the drawing module in FIG. 2.

The logic for the DRAWING MODULE is provided in FIG. 10. For simplicity, the logic for this module is illustrated for the case of a single program array—however, all data arrays associated with the CEA Rod Position System are similarly processed. This module is called by the EFP CALCULATION MODULE if condition STOP=1 is true. The DRAWING MODULE provides the graphical outputs for the "rolling wheel" and "sliding bar" display formats. The module functions are described in generalized functional terms as the actual draw commands are dependent upon the specific graphics drawing package which is utilized. Referring to FIG. 10, box 350 determines the requested display format (either "rolling wheel" or "sliding bar" dependent upon the last drawing format selection as made by the operator). Box 351 queue's the corresponding drawing templet (either "rolling wheel" or "sliding bar" display format). Boxes 352 to 354 then keeps track of the number of segments to draw from the CEA Scaling Array (S(J)). This array ranges from array element number 1 (S(1)) to array element number "Kend" (S(Kend)) where "Kend" is calculated via box 335 in FIG. 8. Box 355 determines the contents of each array element for the CEA Scaling Array (S(J)). If the value of a CEA Scaling Array element is equal to 1 (S(J)=1) then the corresponding segment in the drawing templet is set to 1 via box 357 (which specifies that a solid arc segment for a "rolling wheel" display format or a solid rectangular segment for a "sliding bar" display format is to be drawn). If the value of a CEA Scaling Array element is not equal to 1 (i.e. S(J)=0) then the corresponding segment in the drawing templet is set to 0 via box 356 (which specifies that a null arc segment for a "rolling wheel" display format or a null rectangular segment for a "sliding bar" display format is to be drawn). The selected drawing segment is then drawn on the CRT (item 66 on FIG. 1) via box 358. Box 359 reinitializes counting variable "J" to zero (0) after all "Kend" segments have been drawn as determined by box 354.

The graphical displays provide the user with an easily understood representation of the accumulated time and accumulated EFPD exposure for CEA rod groups relative to the LCO's. The display formats are designed to present the data in terms of a contiguous monitoring interval using a spatial representation.

Figure 21:
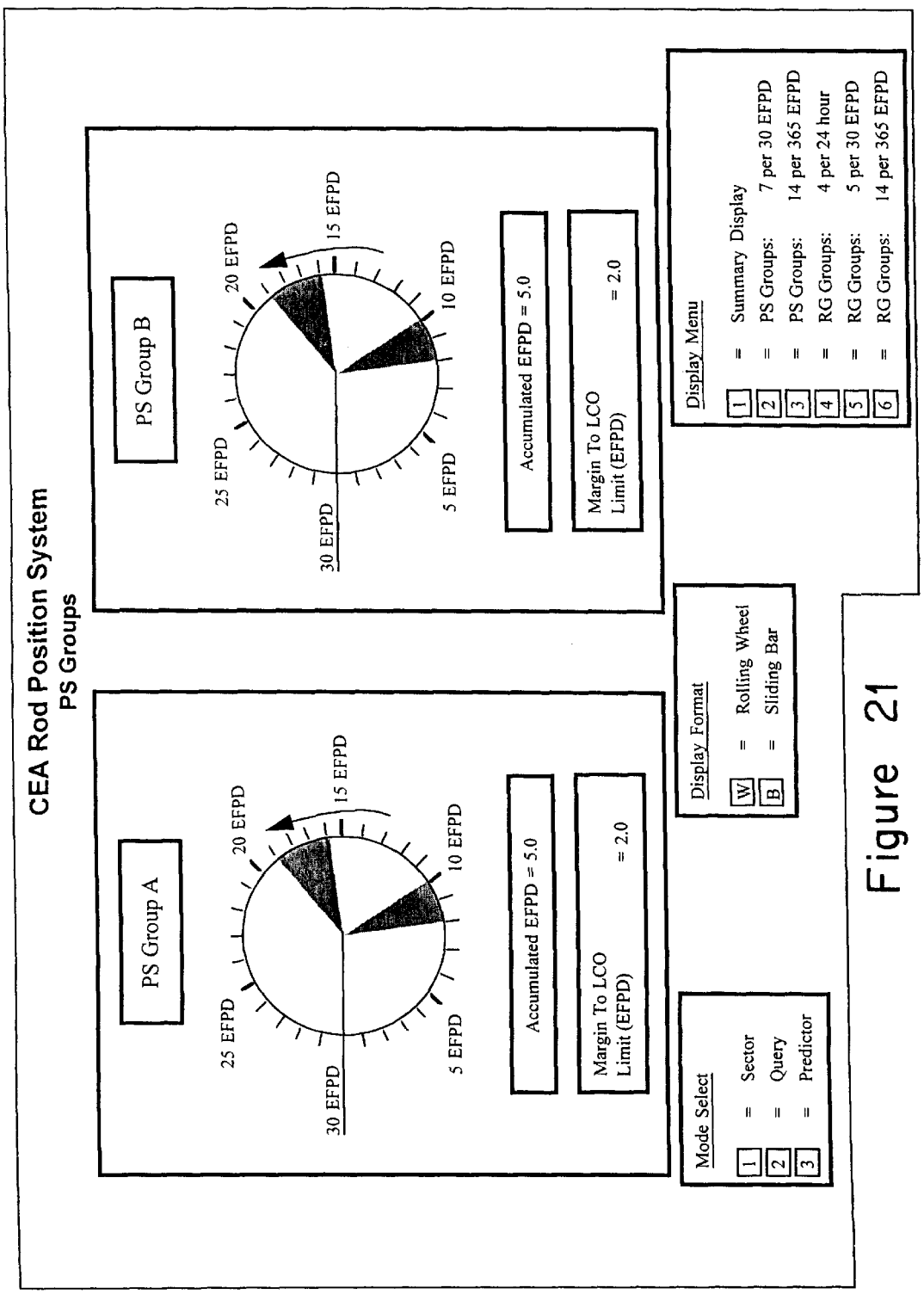
FIG. 21 illustrates the format of the "rolling wheel" display according to the invention.

FIG. 21 illustrates the format of the "Rolling Wheel" display. In this embodiment, two Part Strength CEA groups are assumed and a LCO limitation of no more than 5 EFPD exposure per 30 EFPD interval is specified (where exposure is defined as a Part Strength group being inserted between the Long Term Steady State Insertion Limit and the Transient Insertion Limit). The 30 EFPD interval is defined to be a contiguous 30 EFPD period. The contiguous 30 EFPD interval is depicted by rotating wheels; one for each Part Strength group. Each wheel rotates in a counterclockwise direction. A full rotation of a wheel (360 degrees) corresponds to the 30 EFPD contiguous monitoring interval. Shaded pie segments within a wheel represent the EFPD exposure for the Part Strength group whenever it was inserted between the Long Term Steady State Insertion Limit and the Transient Insertion Limit. As EFPD is accumulated, old exposure data is continuously discarded (rolls off the "Rolling Wheel"), while new data is continuously added (rolls on to the "Rolling Wheel"). Thus, the exposure of the Part Strength rod groups is maintained for a contiguous monitoring interval (window) using a spatial representation.

Figure 22:
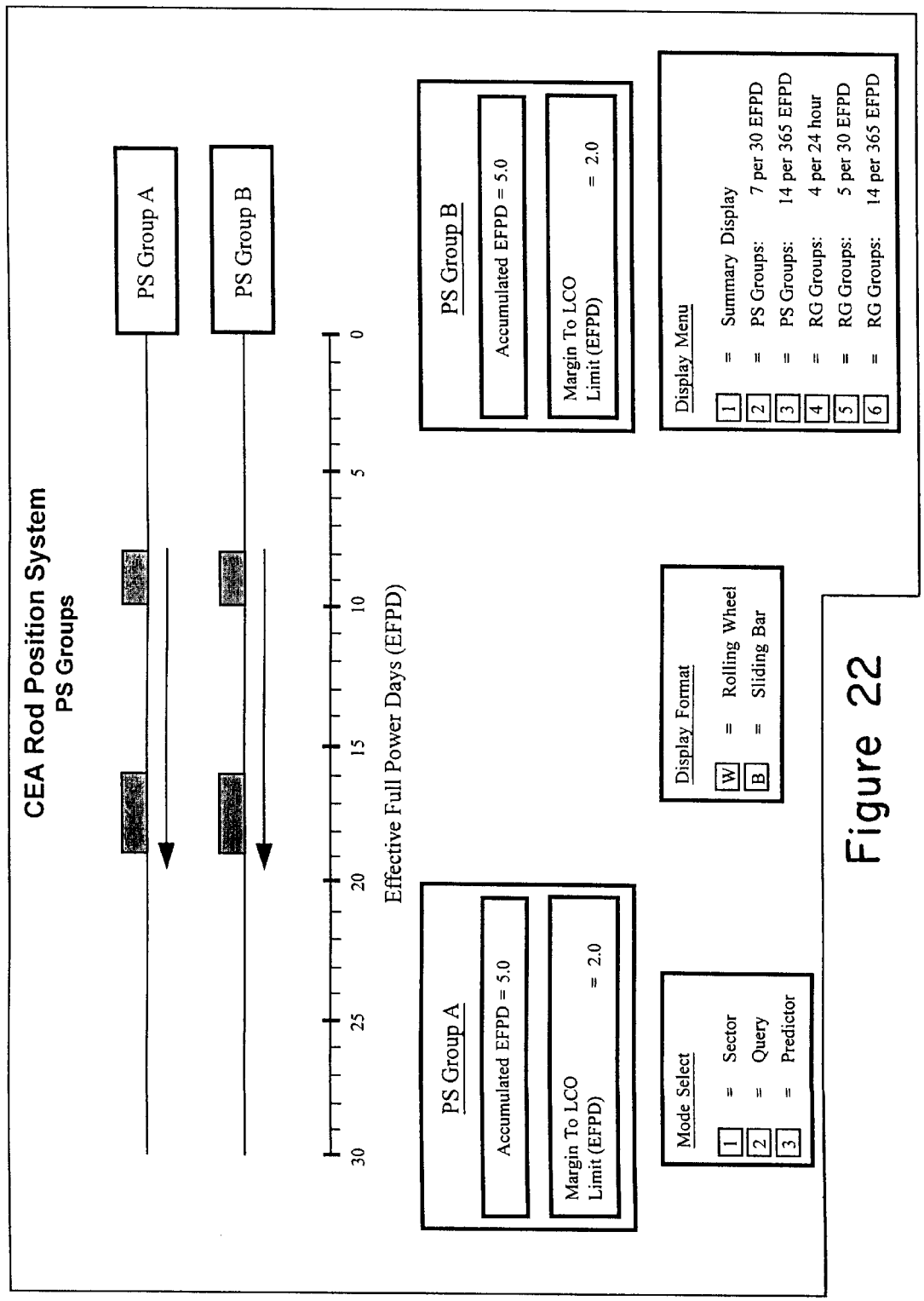
FIG. 22 illustrates the format of the "sliding bar" display according to the invention.

FIG. 22 illustrates the format of the "Sliding Bar" display. As with FIG. 21, two Part Strength CEA groups are assumed and a LCO limitation of no more than 5 EFPD exposure per 30 EFPD interval is specified (where exposure is defined as a Part Strength group being inserted between the Long Term Steady State Insertion Limit and the Transient Insertion Limit). The 30 EFPD interval is defined to be a contiguous 30 EFPD period.

The contiguous 30 EFPD interval is depicted by a linear line. The length of the line represents the contiguous 30 EFPD interval. There are two such linear lines, one for each Part Strength group. "Bars", which are located above each line, represent the EFPD exposure for the Part Strength group whenever it was inserted between the Long Term Steady State Insertion Limit and the Transient Insertion Limit. The "Bars" slide along the line, moving from right to left. A full translation of the line by a "Bar" corresponds to a "Bar" fully transitioning the 30 EFPD contiguous monitoring interval. As EFPD is accumulated, old exposure data is continuously discarded ("Bars" or portions thereof slide off the line), while new data is continuously added ("Bars" or portions thereof slide on to the line). Thus, the exposure of the Part Strength rod groups is maintained for a contiguous monitoring interval (window) using a spatial representation.

The Sector feature which is associated with the graphical displays (FIGS. 21 and 22) allows users to define "sectors" within the "Rolling Wheel" and "Sliding Bar" displays to be expanded and thus examined at higher resolutions. After the user enters the desired sector region to be expanded, the scales on the "Rolling Wheels" or "Sliding Bars" are rescaled to the range as entered by the user and the accumulate exposure data is displayed with proportionally greater resolution.

The Query Mode (selected per FIGS. 21 and 22) allows the user to: (1) recall historic information and (2) to determine when a certain level of accumulated exposure (in terms of hours and/or EFPD) will "roll off/slide off" and be regained as usable margin (by having the user enter the future planned "power-time" profile for the plant).

The Summary Display Mode (FIG. 23) provides an overall assessment of the current accumulated exposure and remaining margin for all Regulating and Part Strength rod groups utilizing a single convenient display page.

Alarming capability (where is this depicted?) is provided to alert the user of an approach to an alarm condition (LCO), so that action may be taken prior to actually exceeding the alarm setpoint. In the event that the alarm setpoint is exceeded, an alarm annunciation alerts the user and provides a display (countdown clock) of the remaining time to take the prescribed corrective action relative to the required Completion Time as specified within the Technical Specifications for operation. In cases for which several corrective actions with differing Completion Time lines are specified, a count down clock representation for each corrective action is displayed.

Figure 11:
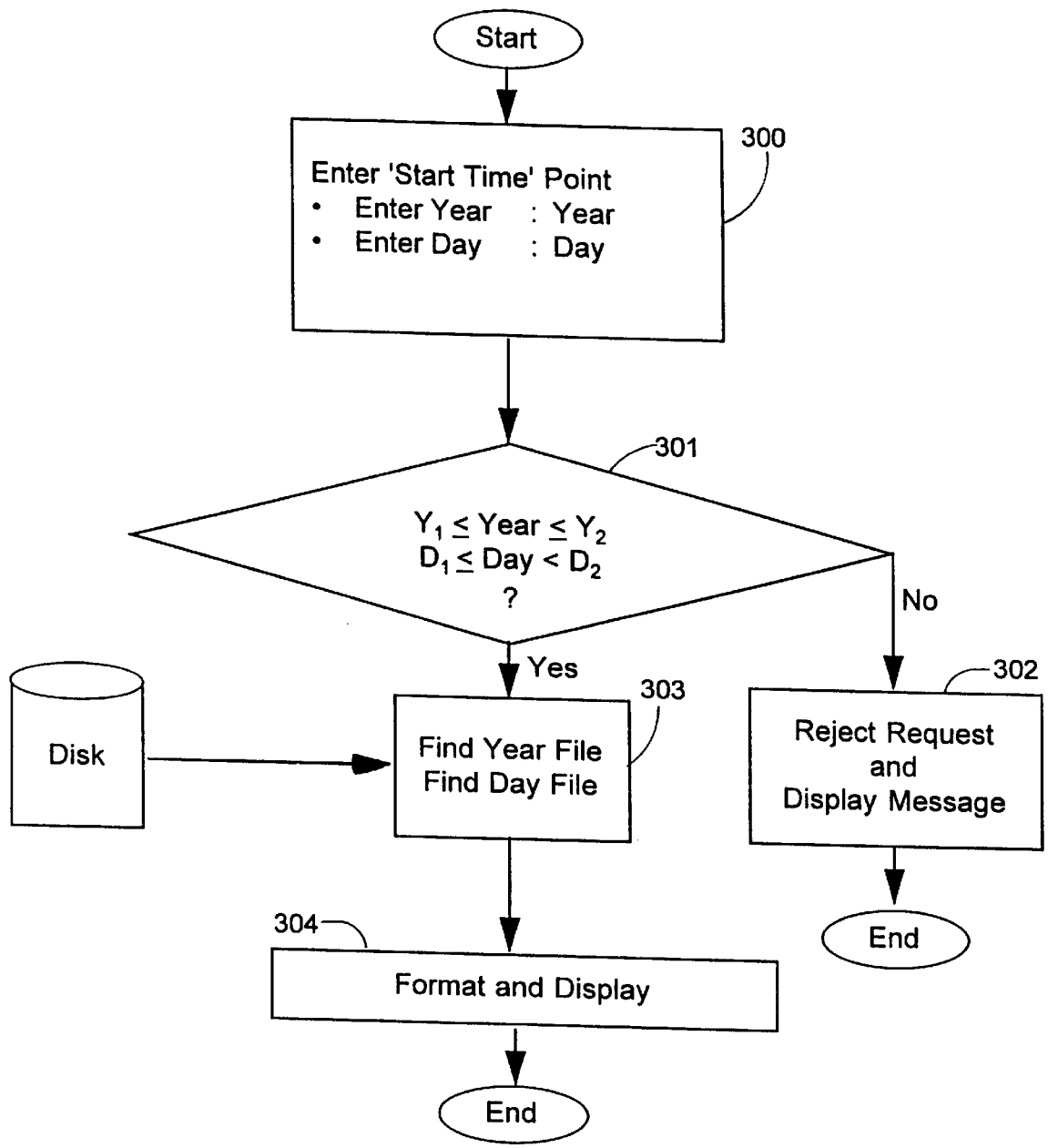
FIG. 11 depicts the functional logic for the historic data playback module shown in FIG. 2.

FIG. 11 depicts the functional logic for the HISTORIC DATA PLAYBACK MODULE. This module is activated whenever an operator selects the "Historic Data Option" function key on the keyboard (item 64 on FIG. 1) that is associated with the digital computer (item 54 on FIG. 1). The HISTORIC DATA PLAYBACK MODULE recalls previously archived CEA exposure historical data for playback and allows the operator to review CEA exposures from previous time intervals. The playback is for one day periods (as determined by the time stamp which is associated with each saved CEA exposure value). Box 300 prompts the operator to enter the "Start Time" point for the historic data and places the requested year and day for the playback into variables "YEAR" and "DAY". Box 301 determines if the "Start Time" requested by the operator is valid and within range of the existing historic data records (Limit D2 is either 364 days or 365 days dependent if "YEAR" corresponds to a "leap year" or not, or it is the current day if "YEAR" is equal to the current year. Limit D1 is either 1 if "YEAR" is greater than the first year of recorded archived records or it is equal to the first day in which the archived record exits if "YEAR" is equal to the earliest year of recorded archived records. Limit Y1 corresponds to the earliest year of recorded archived records and limit Y2 corresponds to the current year.). If an invalid time request is entered, box 302 rejects the request and displays an error message to the operator on the CRT (item 66 on FIG. 1). If the operator request is for a valid "Start Time", box 303 then recalls the historic archived CEA exposure record file (via the digital computer disk, item 62 on FIG. 1) based on the "YEAR" and "DAY" values. The program will use the first array element it encounters that begins on the requested day. Array elements are time stamped with the hour, day and year that they were recorded. The selected historic data is then formatted in a tabular format via box 304 and is output on the CRT (item 66 on FIG. 1).

The playback of historic data is terminated when the operator selects a "Return to Real Time Data" option. This option is only displayed on the CRT when a Historic Data Playback is active. The "Return to Real Time Data" option is activated via a function key on the computer keyboard (item 64 on FIG. 1).

The Predictor Mode (selected per FIGS. 21 and 22) allows the effect of a planned CEA Rod Group maneuver (for accumulated hours and/or EFPD exposure) to be assessed in advance of performing the actual maneuver. The user enters the planned Rod Group maneuver ("position-time" profile for the rod groups) and the anticipated plant "power-time" profile. The system then determines if there is sufficient margin (hours or EFPD exposure) to perform the maneuver based on the current exposure data and the information as entered by the user. If insufficient time (hours) or EFPD margin is available, the Predictor Mode projects when suitable margin will be regained to allow the maneuver to occur while maintaining compliance with the LCO's.

Figure 12:
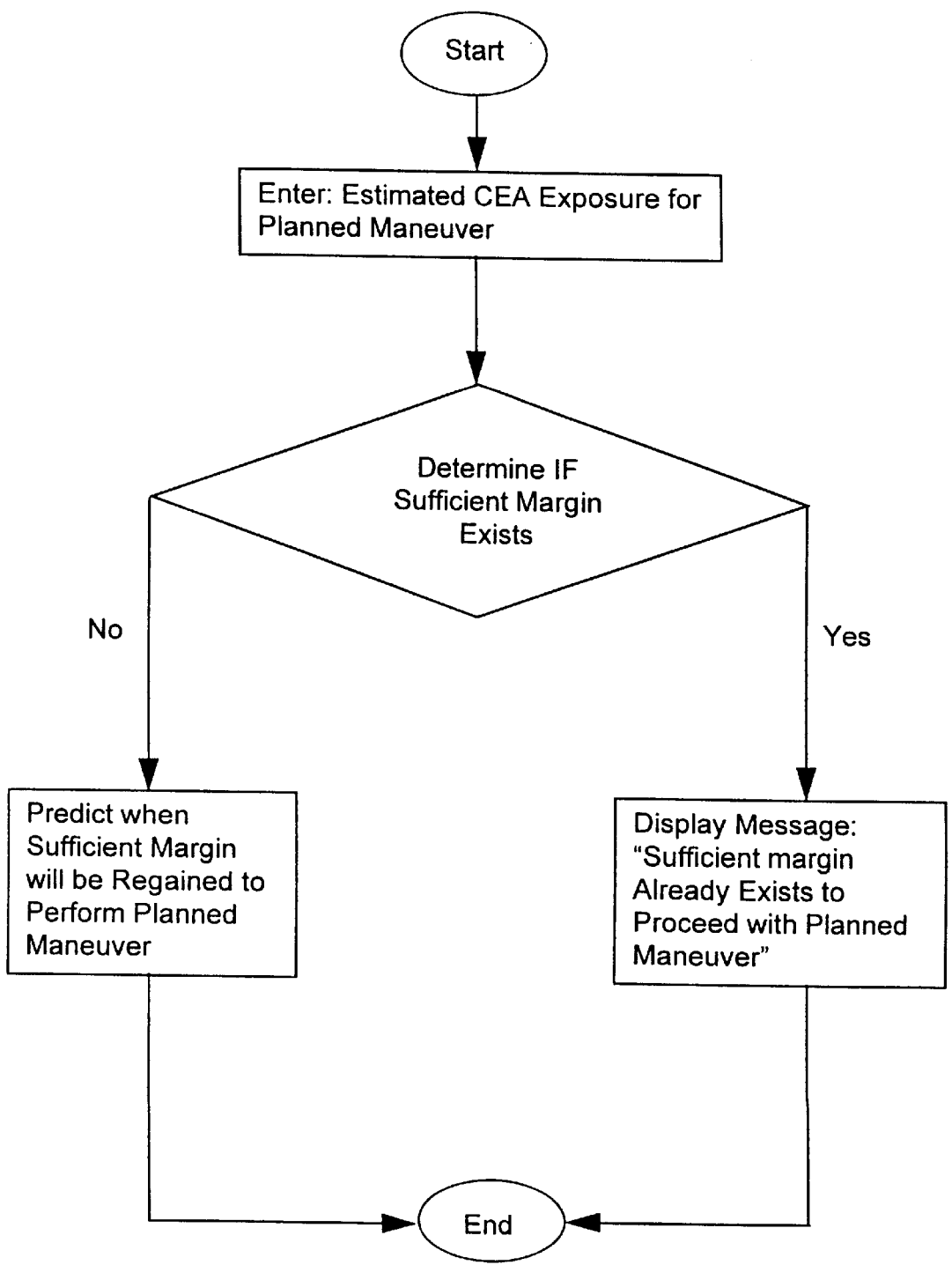
FIG. 12 depicts the functional logic associated with the predictor module shown in FIG. 2.

An overview of the logic for the PREDICTOR MODULE is provided in FIG. 12. This module is called by the PROGRAM EXECUTIVE whenever a request is made for the Predictor Mode of operation. Requests are made via a function key on the digital computer keyboard, item 64 on FIG. 1. The PREDICTOR MODULE predicts if sufficient CEA exposure margin currently exists to perform a planned CEA maneuver. If insufficient margin exits, the PREDICTOR MODULE predicts when sufficient CEA exposure margin will be regained to perform the planned CEA maneuver. Referring to FIG. 12, an estimate of the CEA exposure for the planned CEA maneuver is entered by the operator, a determination is then made if sufficient CEA exposure margin currently exists to perform the planned CEA maneuver. If sufficient CEA exposure margin currently exists, a message is output to the operator indicating that sufficient margin exists to perform the planned maneuver. If insufficient CEA exposure margin currently exists, then the program predicts when sufficient margin will be regained to perform the planned maneuver.

Figure 13:
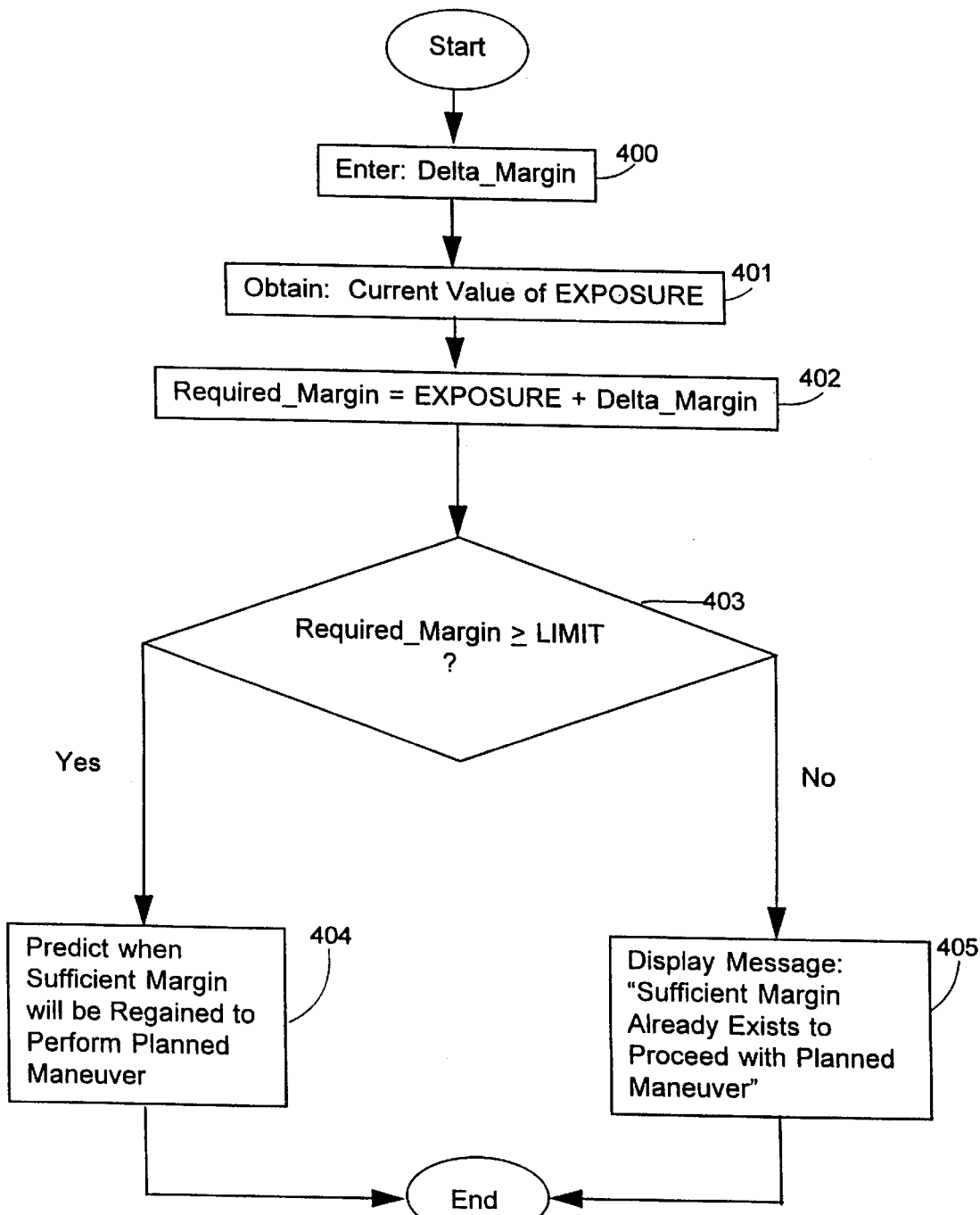
FIG. 13 depicts additional logic associated with the predictor module in conjunction with FIG. 12.

FIG. 13 depicts the basic logic for the PREDICTOR MODULE. In box 400, the value of the estimated value of CEA exposure for the planned maneuver is entered by the operator and stored in variable "Delta_Margin". Box 401 next obtains the current value of CEA exposure ("EXPOSURE") as last computed by the CEA EXPOSURE CALCULATION MODULE (box 305 of FIG. 7) which is stored in the data base. Box 402 then determines the total required CEA exposure which would occur if the planned CEA maneuver is performed at the current point in time ("Required_Margin"). This total required CEA exposure margin is the sum of the current CEA exposure ("EXPOSURE") and the estimated CEA exposure to perform the planned maneuver ("Delta_Margin"). Next, box 403 determines if there is sufficient margin to perform the planned CEA maneuver by comparing variable "Required_Margin" to the LCO ("LIMIT"). The LCO limit is stored in the data base of the digital computer (item 60 of FIG. 1). If there is presently sufficient total CEA exposure margin to perform the planned maneuver then box 405 outputs a message to the operator on the CRT indicating that sufficient margin exists to perform the planned maneuver. If insufficient total CEA exposure margin currently exists, then box 404 predicts when sufficient margin will be regained to perform the planned maneuver by executing the MARGIN PREDICTION MODULE which is illustrated in FIG. 14.

Figure 14:
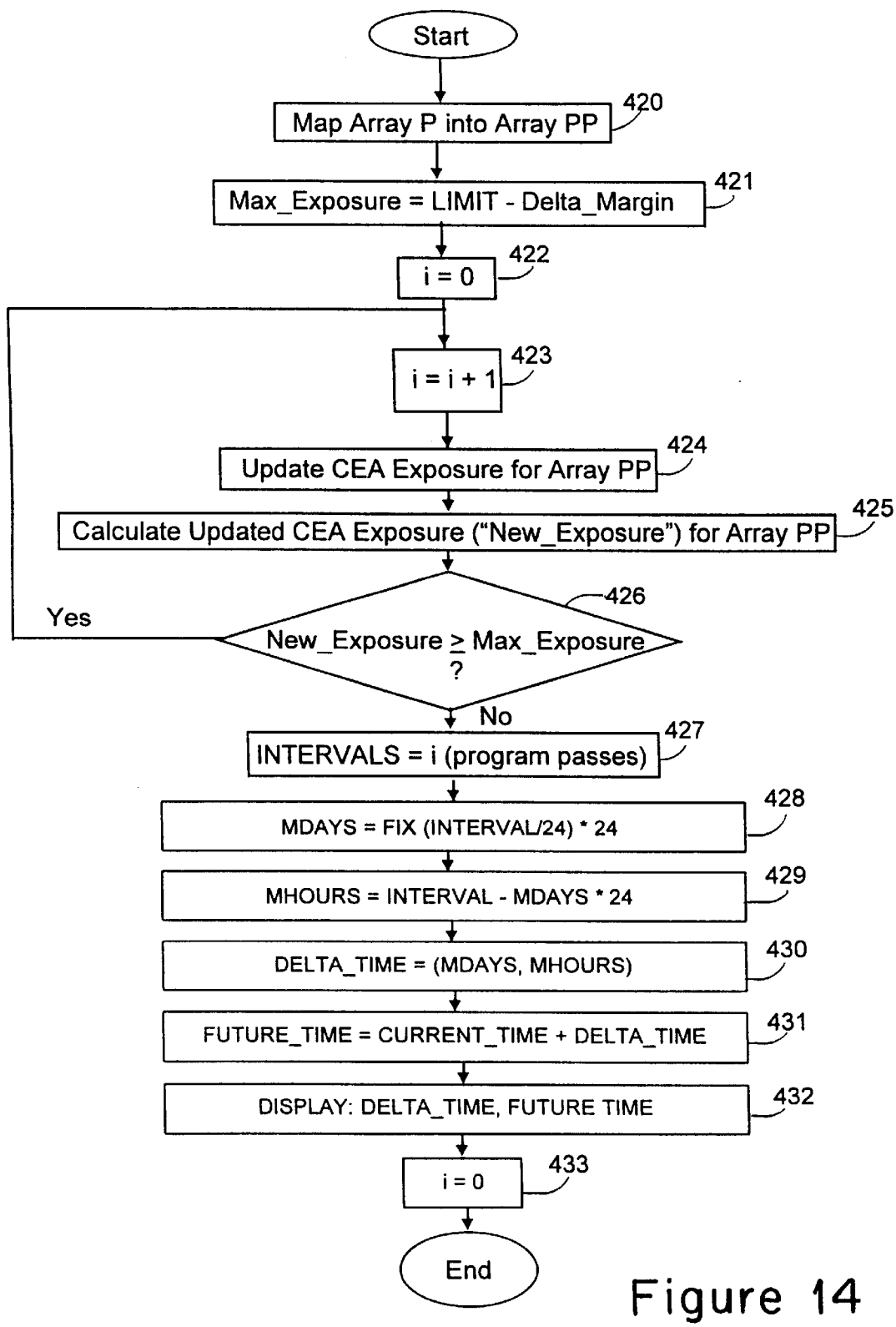
FIG. 14 is a flow diagram representing the logic associated with the margin prediction module of FIG. 2.

With reference to FIG. 14 (MARGIN PREDICTION MODULE), box 420 first maps the Accumulated CEA Exposure data, stored in the CEA Exposure Data Array (array "P(J)") into a second array (array "PP(J)") which is then further utilized in the MARGIN PREDICTION MODULE to predict when CEA exposure margin will be regained. For simplicity, the logic is illustrated for the case of a single program array—however, all requisite data arrays associated with the CEA Rod Position System are similarly processed. Array "PP(J)" is used to avoid altering data in array "P(J)" while performing the prediction computations.

Figure 15:
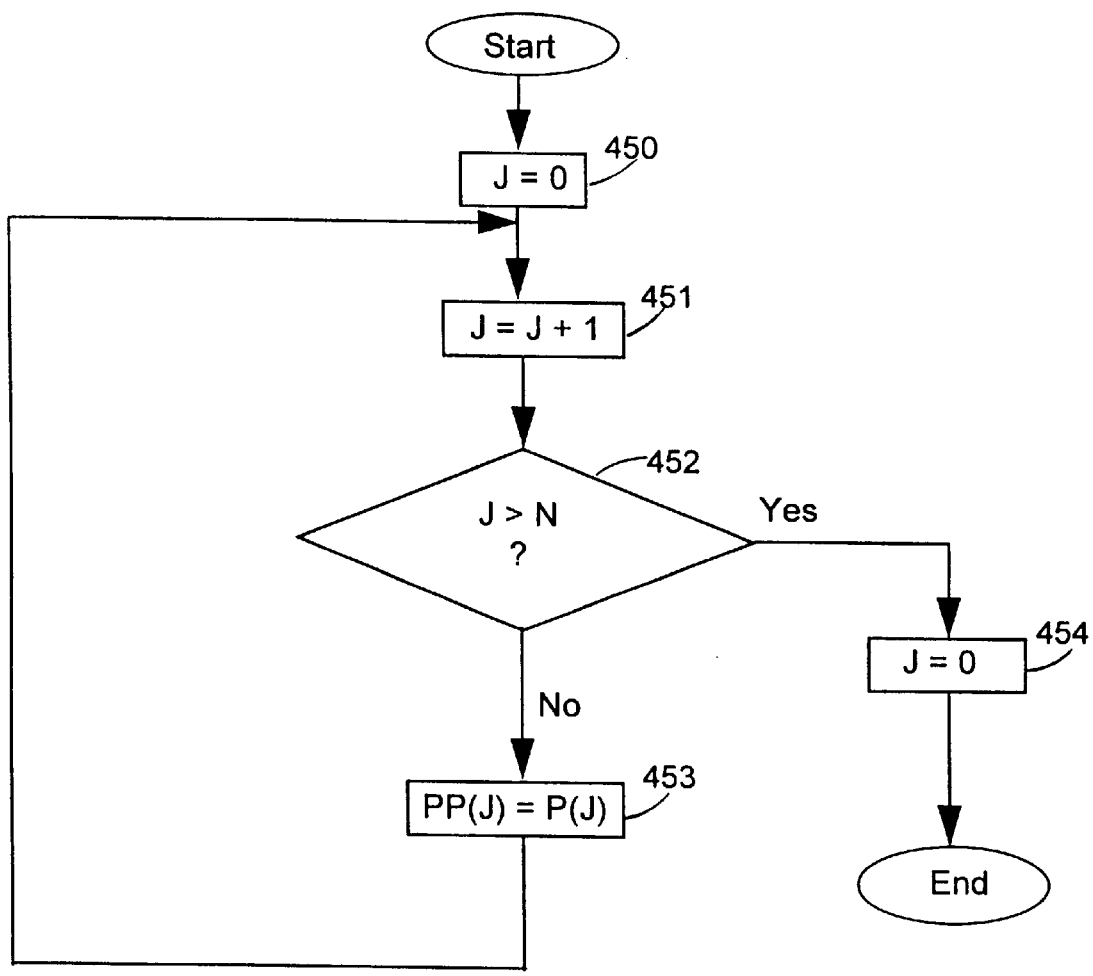
FIG. 15 depicts the functional logic associated with the array mapping module of FIG. 2.

The logic for the Array Mapping is now explained. After this logic is described, an explanation of the MARGIN PREDICTION MODULE, FIG. 14, will resume. The Array Mapping is illustrated in FIG. 15 (ARRAY MAPPING MODULE). Box 450 initiates the logic by setting the counting variable "J" to zero. Boxes 451 and 452 determine when all the array elements from array "P(J)" have been mapped into array "PP(J)". The completion of the array mapping occurs when counting variable "J" is greater than the highest numbered array element in the CEA Exposure Data Array (array element number "N"). Box 453 performs the mapping by setting the value of array element "PP(J)" to the value of array element "P(J)". When all the array elements from array "P(J)" have been mapped into array "PP(J)" then box 454 resets counting variable "J" to zero.

Returning to the MARGIN PREDICTION MODULE of FIG. 14, after the array mapping, then box 421 determines the maximum allowable accumulated CEA exposure which would still allow the planned CEA maneuver to occur by computing the difference between the LCO margin limit ("LIMIT") and the CEA exposure required to perform the planned CEA maneuver ("Delta_Margin"). This value is stored in variable ("Max_Exposure") and represents the amount of accumulated CEA exposure that can exist prior to beginning the planned CEA maneuver (values of CEA exposure which are larger than this amount will result in insufficient CEA exposure margin to perform the planned maneuver; i.e.—the sum of the CEA exposure required to perform the maneuver and the current value of CEA exposure is such that they collectively exceed the LCO as specified in variable "LIMIT"). Boxes 422 to 426 then continually update array "PP(J)" until sufficient CEA exposure margin is lost (as determined via variable "New_Exposure"). This is determined as follows: a value of zero is inserting into position "PP(1)" (which represents the most recent 1 EFP-hour interval); each element of array "PP(J)" is then upward shifted by one position; and finally the value of the last array element "PP(N)" is deleted. This process simulates plant operation with all CEA rods above the Steady State and Transient Insertion Limits (for this condition, no CEA exposure accumulation occurs). Box 422 initializes the counting variable to zero while box 423 accumulates the number of simulated 1 EFP-hour intervals with zero CEA exposure accumulation (this is equivalent to the number of program passes for the "Margin Prediction Calculation"). For each program pass, box 424 (UPDATE CEA EXPOSURE FOR ARRAY PP MODULE) updates the CEA exposure for array "PP" (zero CEA exposure for the most recent simulated 1 EFP-hour interval) and box 425 (NEW_MARGIN CALCULATION MODULE) calculates the corresponding new value of accumulated CEA exposure (which is stored in variable "New_Exposure"). Program passes are continually made (each pass representing 1 EFP-hour interval with no CEA exposure accumulation) until sufficient old margin "rolls off" and the remaining accumulated CEA exposure ("New_Exposure") is sufficiently reduced to allow the planned maneuver, as determined by box 426.

Figure 16:
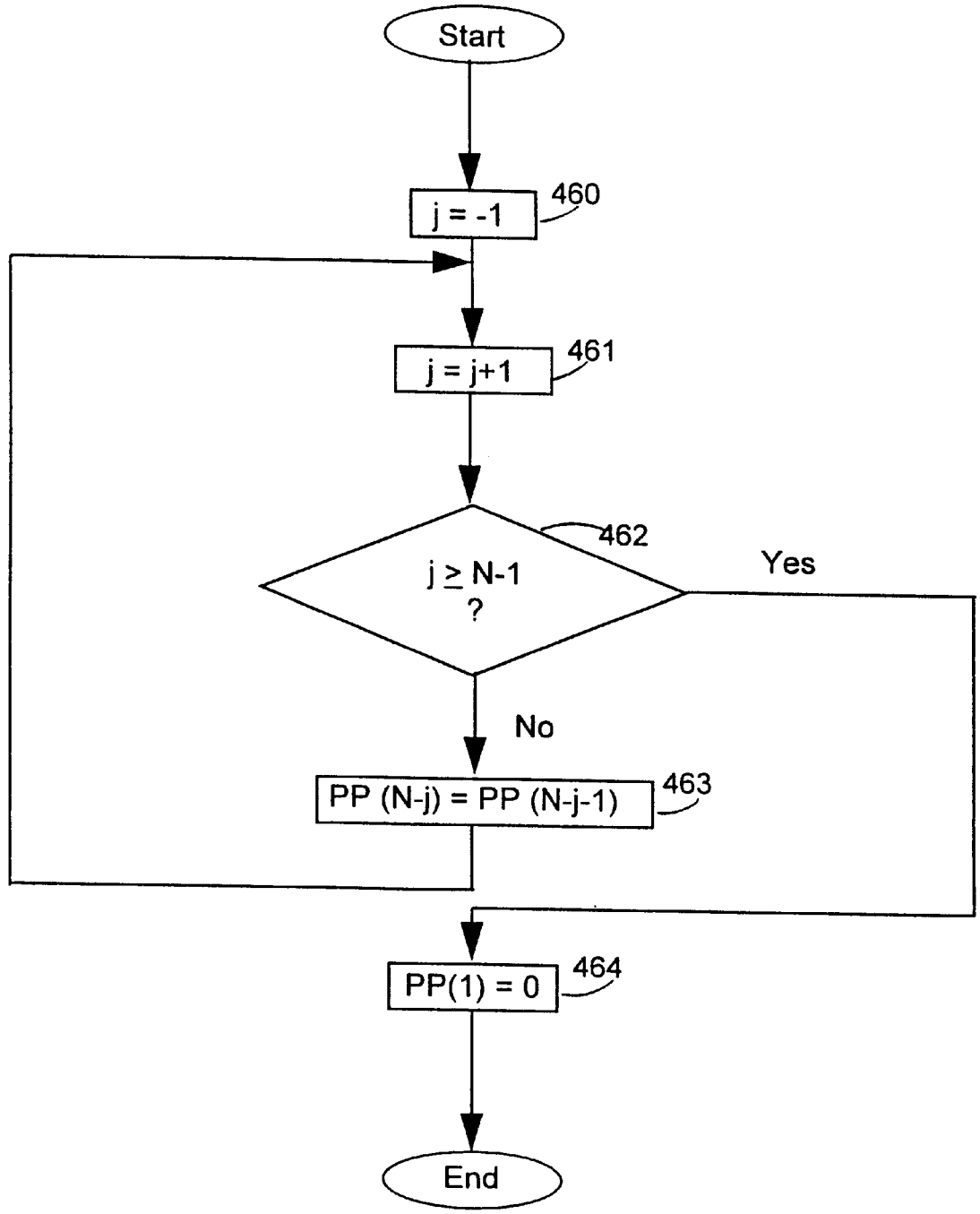
FIG. 16 is a flow diagram representing the logic associated with the CEA exposure update module in FIG. 2.

The logic for the UPDATE CEA EXPOSURE FOR ARRAY PP MODULE is now explained. After this logic is described, explanation of the MARGIN PREDICTION MODULE, FIG. 14, will resume. The UPDATE CEA EXPOSURE FOR ARRAY PP MODULE is illustrated in FIG. 16. When called, this module updates (shifts up by one position) each element of array "PP(J)" and inserts a value of zero into the first array position ("PP(1)"). Thus, the first position of the array "PP(1)" is updated with a value of zero, the second array position is updated with the value from the first array position, etc. until all CEA exposure data has been shifted up 1 EFP-hour interval in the array. The last array element "N" (which represents the oldest CEA exposure data) is discarded since it is now beyond the LCO EFP duration criteria. This shifting of elements of array "PP(J)" represents a 1 EFP-hour interval of operation with zero CEA exposure accumulation.

Box 460 first initializes the counting variable. Boxes 461 to 463 shift up the data array elements, beginning from the last array position (that is, first array element "N-1" is shifted into array position "N", then array element "N-2" is shifted into array position "N-1", etc.) until array element 1 (the last shift performed by boxes 461 to 463 is from array position 1 to array position 2). After array position 1 is shifted into position 2, box 464 inserts a value of zero (0) into array position "PP(1)". This shifting which occurs during a single program pass represents 1 EFP-hour interval of operation with zero (0) CEA exposure accumulation.

Returning now to the MARGIN PREDICTION MODULE of FIG. 14, after execution of the UPDATE CEA EXPOSURE FOR ARRAY PP MODULE is completed, then box 425 determines the new value of CEA exposure for array "PP(J)" which is calculated by the NEW_MARGIN CALCULATION MODULE.

Figure 17:
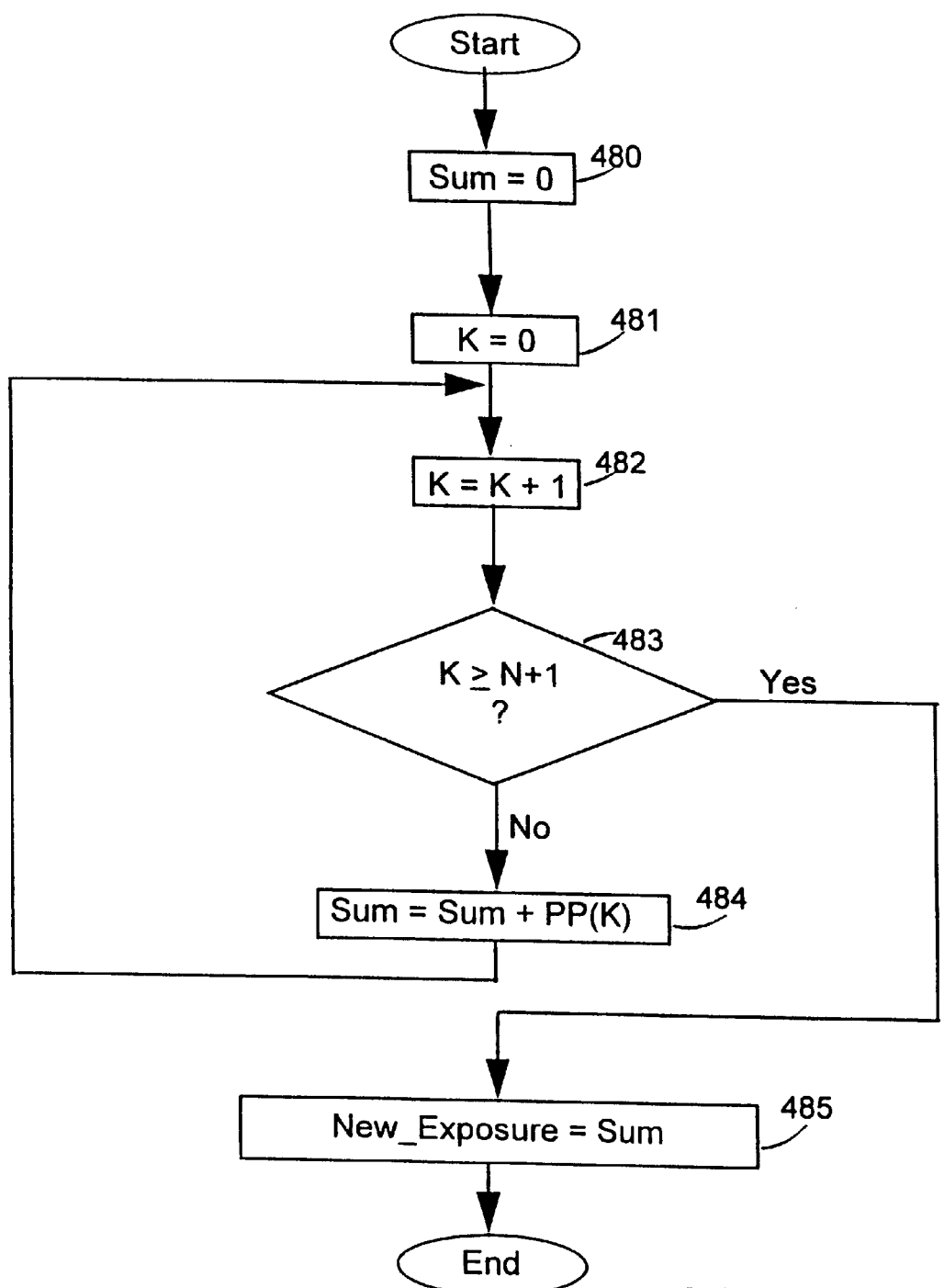
FIG. 17 is a flow diagram representing the logic associated with the new margin calculation module shown in FIG. 2.

The logic for the NEW_MARGIN CALCULATION MODULE is now explained. After this logic is described, explanation of the MARGIN PREDICTION MODULE, FIG. 14, will resume. The NEW_MARGIN CALCULATION MODULE is illustrated in FIG. 17. This module determines the value of CEA exposure for array "PP(J)". This module is called by the MARGIN PREDICTION MODULE immediately after the elements of array "PP(J)" have been shifted up by one position (equivalent to a 1 EFP-hour interval with no CEA exposure accumulation). Referring to FIG. 17, boxes 480 to 485 calculate the current value of CEA exposure in array "PP(J)" by summing the contents of each array element. The contents of each array element contains the value of CEA exposure for a given 1 EFP-hour interval. The total accumulated CEA exposure is then stored in variable "SUM" via box 484 after all "N" array elements are added (as determined via box 483). The module then sets variable "New_Exposure" to variable "SUM" in box 485.

Returning to the MARGIN PREDICTION MODULE of FIG. 14, after the value of "New_Exposure" is determined, box 426 then determines if the value of "New_Exposure" is greater than the value of "Max_Exposure". If true, then insufficient CEA exposure margin has yet to "roll off" (the present CEA exposure accumulation as stored in variable "New_Exposure" is such that there is insufficient available margin to accommodate the "Delta_Margin" and remain within the LCO as defined in variable "LIMIT") and the module then begins another program pass (equivalent to another 1 EFP-hour interval with zero CEA exposure) by returning to box 423. When sufficient CEA exposure margin has "rolled off" (false condition for box 426) then the total number of EFP intervals to achieve the reduction (as contained in counting variable "I") is then stored in variable "INTERVALS" via box 427. Variable "INTERVALS" therefore represents the number of hours in which sufficient CEA exposure margin will be regained to perform the planned maneuver, assuming the plant operates at a power rating of 100% EFP. Boxes 428 to 430 convert "INTERVALS" into equivalent time in terms of "days" and "hours" and box 431 translates this time interval into calendar time. Box 432 displays the predicted time (at a power condition of 100% EFP) when sufficient CEA exposure margin will be regained to perform the planned CEA maneuver. An example of the displayed output would be as follows: "Sufficient Margin will exist after "DD" days and "HH" hours of operating at a power level of 100% EFP which corresponds to "DAY, MONTH, YEAR and TIME". If operating at less than 100%

EFP, then the time period will be proportional to the value of EFP relative to 100% EFP e.g., (100% EFP)/(actual EFP)". Finally, box 433 resets the counting variable to zero.

In the event of a system outage, the Update Mode allows the system to be recalibrated to the current operational conditions. After the system is brought on-line, the user enters the appropriate plant "time-power" profile and the rod group exposure profile for the outage interval. Based on this information and the rod exposure information stored up to the time of the outage, the system is recalibrated to the current operational conditions and restored to operational service.

Figure 18:
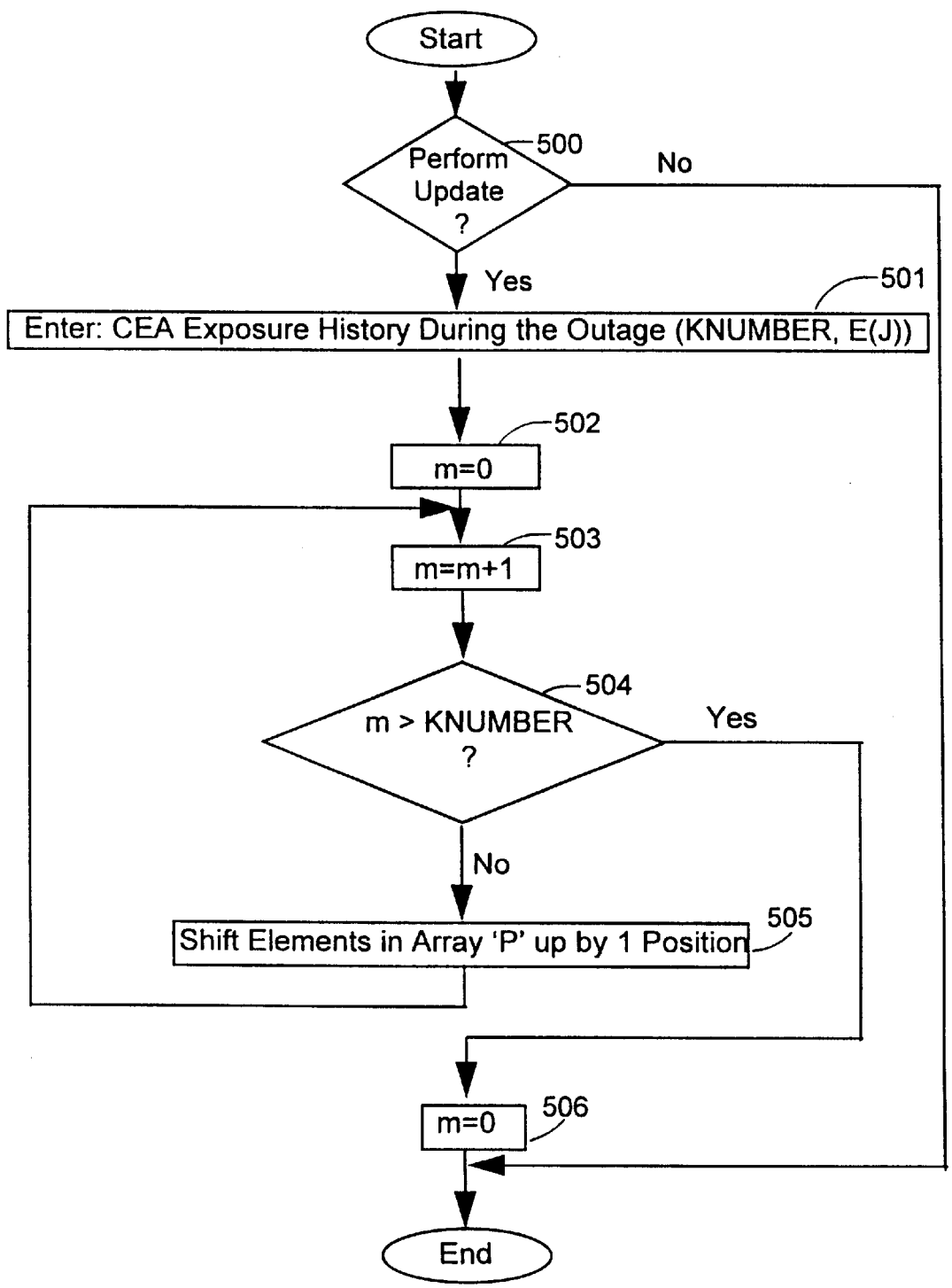
FIG. 18 is a flow diagram representing the logic associated with the update module shown in FIG. 2.

FIG. 18 depicts the basic logic for the UPDATE MODULE. This module is called by the PROGRAM EXECUTIVE whenever there is a computer restart or whenever requested by the operator via a function key on the keyboard (item 64 on FIG. 1) associated with the digital computer. Box 500 first requests that the operator confirm that an Update is to be performed. If the operator enters a "yes" to this prompt (using the keyboard) then, via box 501, the operator is prompted to enter the CEA exposure history for the outage period. The operator enters this information using the keyboard in conjunction with an update data templet which appears on the CRT screen (item 66 in FIG. 1). For each hourly EFP interval which occurred during the outage, the operator determines if there was any CEA exposure for that interval. For hourly EFP intervals in which there was no CEA exposure, the operator enters zero. For hourly EFP intervals in which there was CEA exposure, the operator enters the value of the CEA exposure which occurred. If the rods were inserted for the full time during a given hourly EFP interval then the CEA exposure corresponds to 1 EFP-hour; if they were inserted for only a portion of the hourly EFP interval, then the CEA exposure would correspond to a fraction of 1 EFP-hour. The operator enters this information for each affected CEA rod group. If a CEA rod group was not inserted during the outage interval, the operator enters a "not inserted" command and the computer sets the CEA exposure for all the hourly EFP intervals to zero for that CEA rod group. This allows a quick update for such cases so the operator need not manually insert a zero for each 1 EFP-hour interval. The operator estimates the EFP information based on written logs of plant power and rod positions for the outage period. Upon completion of the operator entry of the CEA exposure history for the outage period, variable "KNUMBER" stores the value of the total number of hourly EFP intervals which occurred during the outage period and array "E(J)" stores the value of CEA exposure (as entered by the operator) for each of the hourly EFP intervals which occurred during the outage. Boxes 502 to 505 then shift the elements of array "P(J)" up by one position and inserts a value of "E(m)" for into the first array element, thus updating the CEA exposure history for a 1 EFP-hour interval. Box 504 determines when the shift has been completed (when condition "m>KNUMBER" is true).

Figure 19:
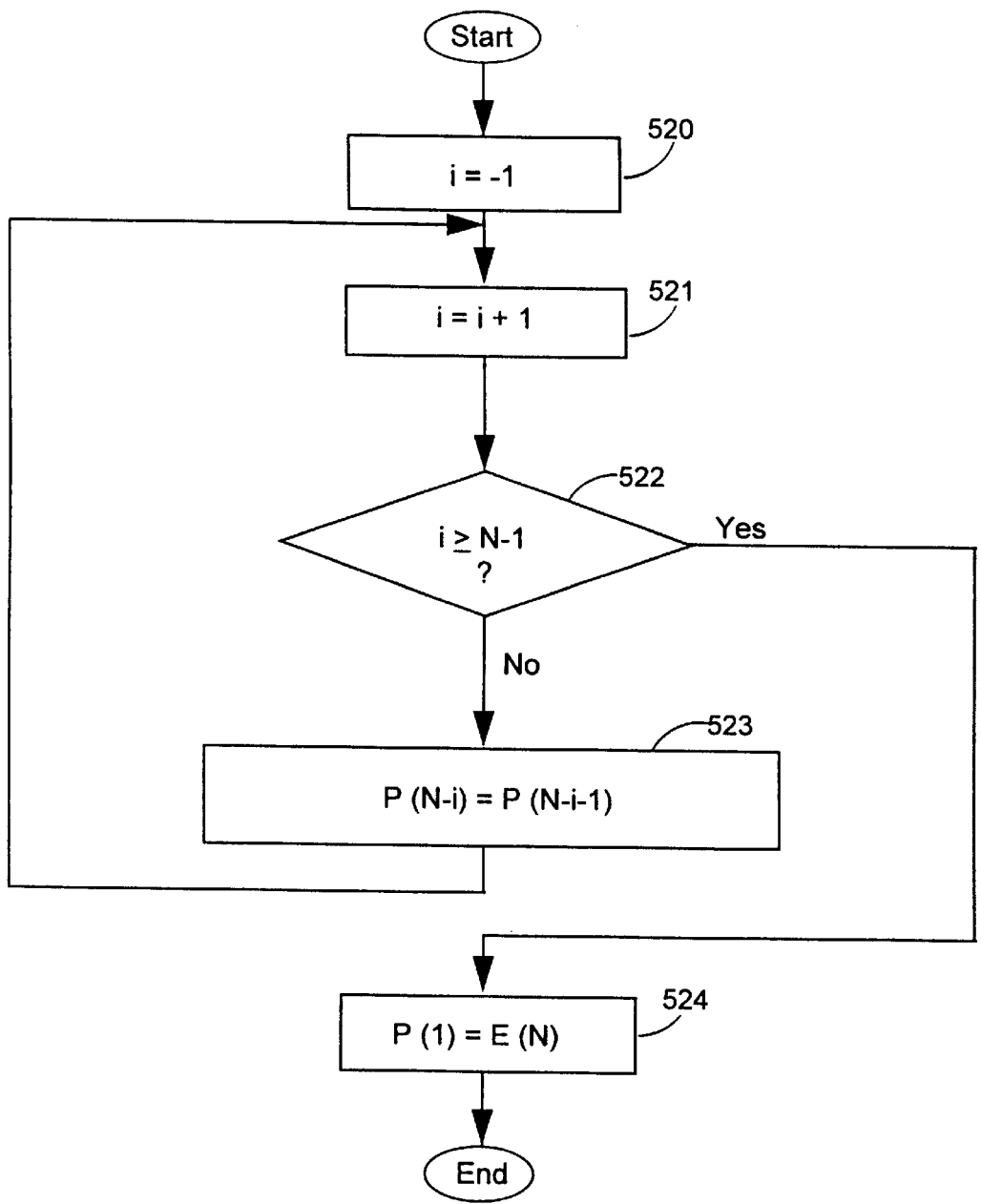
FIG. 19 is a flow diagram representing the logic associated with the hourly EFP interval update module shown in FIG. 2.
Figure 20:
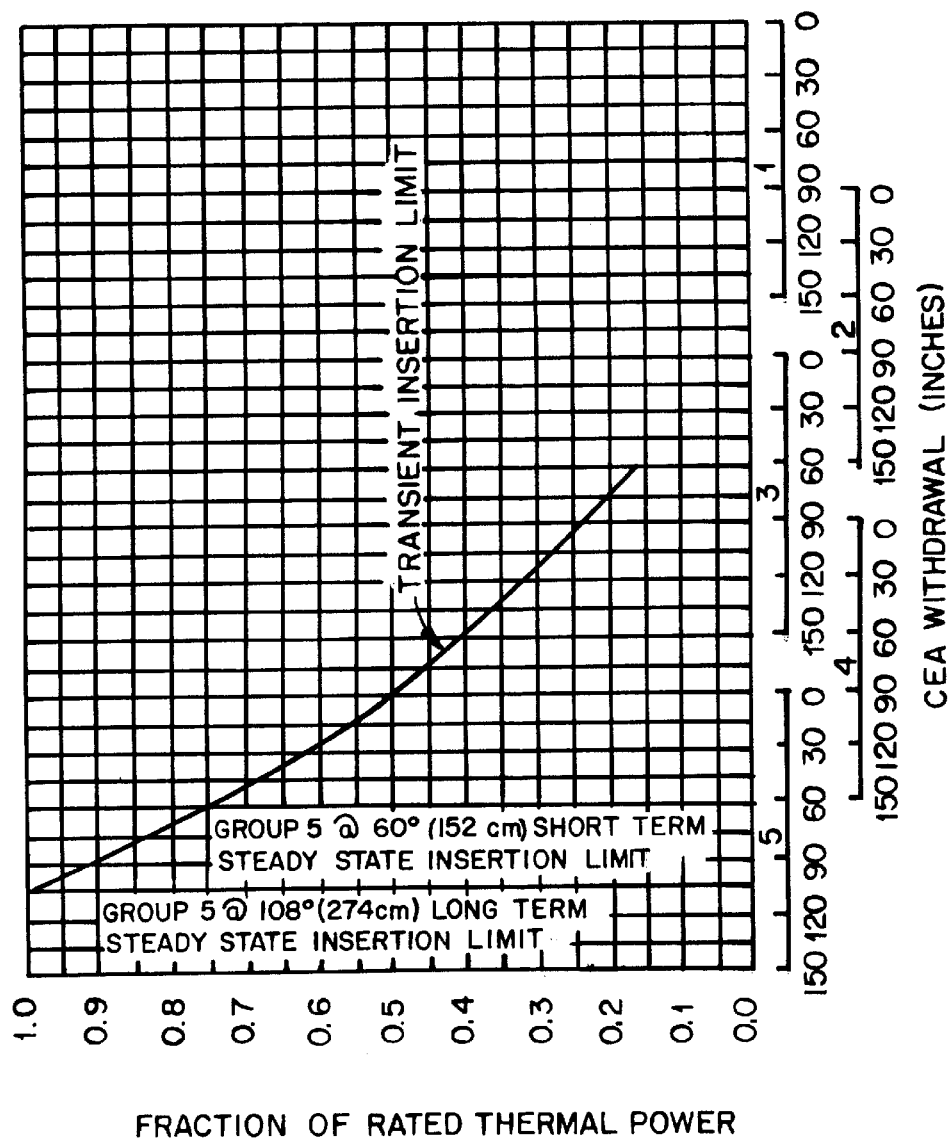
FIG. 20 is a graphic representation of a typical relationship among core rated power, CEA group sequential overlap, and technical specification limits on group position.

The logic for box 505 is now explained. After this logic is described, explanation of the UPDATE MODULE, FIG. 18, will resume. The HOURLY EFP INTERVAL UPDATE MODULE is illustrated in FIG. 19. When called, this module updates (shifts up by one position) each element of array "P(J)" and inserts the CEA exposure value as entered into "E(m)" into the first array position ("P(1)"). Thus, the first position of the array "P(1)" is updated with the value of CEA exposure as was entered by the operator into "E(m)" for this EFP hourly interval, the second array position is updated with the value from the first array position, etc. until all CEA exposure data has been shifted up 1 EFP-hourly interval in the array. The last array element "N" (which represents the oldest CEA exposure data) is discarded. This shifting of elements of array "P(J)" up by one position represents a 1 EFP hourly update interval.

Referring again to FIG. 19, box 520 first initializes the counting variable. Boxes 521 to 523 shift up the data array elements, beginning from the last array position (that is, first array element "N-1" is shifted into array position "N", then array element "N-2" is shifted into array position "N-1", etc.) until array element 1 (the last shift performed by boxes 521 to 523 is from array position 1 to array position 2). After array position 1 is shifted into position 2, box 524 inserts the value of CEA exposure as was entered by the operator into "E(m)" for this EFP hourly interval. Thus array "P(J)" is updated for a 1 EFP hourly period.

With further reference to the UPDATE MODULE of FIG. 18; after the elements of array "P(J)" have been updated for 1 EFP hourly interval, then boxes 503 and 504 determine when the array has been updated for all of the EFP hourly periods which occurred during the outage. This occurs when box 504 determines that the condition "m>KNUMBER" is true. Box 506 then resets the counting variable to zero.

From the foregoing, it can be appreciated that the invention has been described in the context of a nuclear power plant having a nuclear reactor core and a multiplicity of control rods arranged for movement through the core for controlling the reactor power. This multiplicity of rods includes a plurality of groups of control rods, the groups being movable through the core in staggered sequence. Each group is subject to an administrative limit on the cumulative exposure in the core while each group is situated within a pre-established position range in the core.

Independent of any symbology utilized in connection with FIGS. 1–20 and associated description hereinabove, one administrative limit can be expressed in the form of a limit index W:X defined by a maximum of W hours of accumulated effective exposure on the sum S of effective exposure occurrences $w_1, w_2 \ldots$ during any X hour reference period, with W<X. Increments in the associated time base, are one hour each. Another form of the administrative limit can be expressed as a limit index Y:Z defined by a maximum of Y effective full power hours of exposure consisting of the sum of effective exposure occurrences $y_1, y_2 \ldots$ during any Z hour reference period of effective full power operation of the core, with Y<Z. Increments in the associated time base, are one effective full power hour each. Yet another administrative limit can be the maximum permitted time interval T during which a group can be positioned between, e.g., the Short Term Steady State Insertion Limit and the maximum insertion position which is permitted during a normal operational transit.

The invention also includes a novel form of displaying the comparison of the accumulated effective exposure for each group with the administrative limit for each group as shown in FIGS. 21–23. In terms of the symbology described immediately above, the display 600,600' of FIGS. 21 and 22 includes at least one scale 601,601' of Z uniform intervals 602,602', marked by a plurality of numeric values 603,603' indicative of an initial zero value 604,604' and a final value Z 605,605'. An indicator configuration 606,606' for each group is displayed, each indicator configuration having a scale associated therewith, and consisting of an indicator 607,607' for each component y of the sum S. Each indicator initially appears at the zero representation of the scale and grows in size toward the scale value Z to span the number of scale intervals corresponding to the ratio of effective exposure of component y to the effective power interval Z.

Independently of but simultaneously with the indicator growth, each indicator along the scale advances toward the scale value Z, at a uniform rate. The sum S of all components y during the immediately preceding interval is displayed 608,608' adjacent to the scale Z. Instantaneous margin M=Y−S, can also be displayed 609,609'. Thus at any given moment, the operator can visually recognize the number of and effective exposure for each component y during the immediately preceding core effective full power interval Z; the total exposure of S during the immediately preceding interval of Z; and the margin M.

In one embodiment, as shown in FIG. 21, a respective scale 601 is displayed for each group. Each scale is displayed as a circle with coincident zero and Z values. Each indicator 607 of a component y is displayed as a sector of the circle, which grows by increasing the included angle of the sector and which advances by continually rotating about the center of the circle toward the value Z. Another display embodiment is shown in FIG. 22. One scale 601' is displayed as a linear segment with the zero value 604' at one end and the Z value 605' at the other end. The indicator configuration 606',606" for each of at least two groups is associated with the one scale. Each indicator 607' of a component y is displayed as a horizontal bar, which grows by increasing in horizontal length, and which advances by continually moving horizontally toward the value Z. Similar displays can be presented for monitoring a limit expressed by W:X. FIG. 23 shows a summary report in a tabular form.

What is claimed is:

1. In a nuclear power plant having a nuclear reactor core and a multiplicity of control rods arranged for movement through the core for controlling the reactor power, the control rods being arranged in groups for movement through the core in staggered sequence, and wherein each said group has imposed thereon an administrative limit of cumulative exposure in the core while each group is situated within a pre-established position range in the core, said administrative limit being in the form of a limit index W:X, defined by a maximum of W hours of accumulated effective exposure on the sum S of effective exposure occurrences $w_1, w_2 \ldots$ during a X hour reference period, a method of monitoring compliance with said administration limit comprising the steps of:

displaying at least one scale of X uniform intervals, marked with a plurality of numeric values indicative of an initial zero value and a final value X;

displaying an indicator configuration for each group, each indicator configuration having a scale associated therewith, and consisting of an indicator for each component w of said sum S, each indicator initially appearing at the zero representation of the scale and growing in size toward the scale value X to span the number of scale intervals corresponding to the ratio of effective exposure of component w to the reference period X;

independently of but simultaneously with said indicator growth, advancing each indicator along said scale toward the scale value X, at a uniform rate;

displaying the sum S of all components w during the immediately preceding period X;

displaying an instantaneous margin value M=W−S;

whereby at any given moment, the operator can visually recognize the number of and effective exposure for each component w during the immediately preceding period X, the total exposure S during the immediately preceding period X, and the margin M.

2. The method of claim 1, wherein, a respective scale is displayed for each group;

each scale is displayed as a circle with coincident zero and X values; and each indicator of a component w is displayed as a sector of the circle, which grows by increasing the included angle of the sector and which advances by continually rotating about the center of the circle toward the value X.

3. The method of claim 1, wherein, one scale is displayed as a linear segment with the zero value at one end and the X value at the other end;

the indicator configuration for each of at least two groups is associated with said one scale; and each indicator of a component w is displayed as a horizontal bar, which grows by increasing in horizontal length and which advances by continually moving horizontally toward the value X.

4. In a nuclear power plant having a nuclear reactor core and a multiplicity of control rods arranged for movement through the core for controlling the reactor power, the control rods being arranged in groups for movement through the core in staggered sequence, and wherein each said group has imposed thereon an administrative limit of cumulative exposure in the core while each group is situated within a pre-established position range in the core, said administrative limit being in the form of a limit index Y:Z, defined by a maximum of Y hours of accumulated effective exposure on the sum S of effective exposure occurrences $y_1, y_2 \ldots$ during a Z hour reference period of effective full power operation of the core, a method of monitoring compliance with said administrative limit comprising the steps of:

displaying at least one scale of Z uniform intervals, marked with a plurality of numeric values indicative of an initial zero value and a final value Z;

displaying an indicator configuration for each group, each indicator configuration having a scale associated therewith, and consisting of an indicator for each component y of said sum S, each indicator initially appearing at the zero representation of the scale and growing in size toward the scale value Z to span the number of scale intervals corresponding to the ratio of effective exposure of component y to the reference period Z;

independently of but simultaneously with said indicator growth, advancing each indicator along said scale toward the scale value Z, at a uniform rate;

displaying the sum S of all components y during the immediately preceding period Z;

displaying an instantaneous margin value M=Y−S;

whereby at any given moment, the operator can visually recognize the number of and effective exposure for each component y during the immediately preceding period Z, the total exposure S during the immediately preceding period Z, and the margin M.

5. The method of claim 4, wherein a respective scale is displayed for each group;

each scale is displayed as a circle with coincident zero and Z values; and each indicator of a component y is displayed as a sector of the circle, which grows by increasing the included angle of the sector and which advances by continually rotating about the center of the circle toward the value Z.

6. The method of claim 4, wherein, one scale is displayed as a linear segment with the zero value at one end and the Z value at the other end;

the indicator configuration for each of at least two groups is associated with said one scale; and each indicator of a component y is displayed as a horizontal bar, which grows by increasing in horizontal length and which advances by continually moving horizontally toward the value Z.

* * * * *